US010935089B2

(12) United States Patent
Nahrwold et al.

(10) Patent No.: US 10,935,089 B2
(45) Date of Patent: Mar. 2, 2021

(54) METHOD OF DETERMINING AND PREDICTING A BALL LOSS IN A BALL AND RAMP ASSEMBLY

(71) Applicant: DANA AUTOMOTIVE SYSTEMS GROUP, LLC, Maumee, OH (US)

(72) Inventors: Thomas L. Nahrwold, Napoleon, OH (US); Jeroen Volckaert, Perrysburg, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 20 days.

(21) Appl. No.: 16/471,392

(22) PCT Filed: Dec. 21, 2017

(86) PCT No.: PCT/US2017/067940
§ 371 (c)(1),
(2) Date: Jun. 19, 2019

(87) PCT Pub. No.: WO2018/119260
PCT Pub. Date: Jun. 28, 2018

(65) Prior Publication Data
US 2020/0116214 A1    Apr. 16, 2020

Related U.S. Application Data

(60) Provisional application No. 62/437,368, filed on Dec. 21, 2016.

(51) Int. Cl.
*F16D 48/06*    (2006.01)
*F16D 23/12*    (2006.01)
(Continued)

(52) U.S. Cl.
CPC ............. *F16D 48/06* (2013.01); *F16D 23/12* (2013.01); *F16D 25/12* (2013.01); *F16D 27/14* (2013.01);
(Continued)

(58) Field of Classification Search
CPC ........ B60W 10/02; F16D 48/06; F16D 23/12; F16D 27/14; F16D 28/00;
(Continued)

(56) References Cited

U.S. PATENT DOCUMENTS

| 4,578,993 A | 4/1986 | Burandt |
| 4,881,611 A | 11/1989 | Nakashima |

(Continued)

FOREIGN PATENT DOCUMENTS

WO    2016081347    5/2016

OTHER PUBLICATIONS

European Patent Office, International Search Report with Written Opinion issued in PCT/US2017/067940, dated Jun. 5, 2018, 17 pages. Rijswijk Netherlands.

*Primary Examiner* — Roger L Pang
(74) *Attorney, Agent, or Firm* — Marshall & Melhorn, LLC

(57) ABSTRACT

A method of detecting a ball loss condition in a ball and ramp assembly. The method includes providing a drive unit having one or more clutch pack assemblies, one or more motors with a motor output shaft and one or more ball and ramp assemblies. One or more actuation profiles are ran by the motors and an amount of motor current used and a position of the output shaft of the motor is measured during the running of actuation profiles. One or more motor current vs. motor output shaft position plots are generated having one or more characteristic curves based on the amount of current measured and the position of the output shaft mea- (Continued)

sured. The amount of motor current is compared to the motor current of characteristic curve at a given output shaft position and based on that comparison a ball loss condition is identified.

16 Claims, 8 Drawing Sheets

(51) Int. Cl.
*F16D 25/12* (2006.01)
*F16D 27/14* (2006.01)
*F16D 28/00* (2006.01)
*B60K 17/36* (2006.01)

(52) U.S. Cl.
CPC .............. *F16D 28/00* (2013.01); *B60K 17/36* (2013.01); *F16D 2023/123* (2013.01); *F16D 2500/302* (2013.01); *F16D 2500/3022* (2013.01); *F16D 2500/501* (2013.01); *F16D 2500/5012* (2013.01); *F16D 2500/5018* (2013.01); *F16D 2500/7041* (2013.01); *F16D 2500/70418* (2013.01)

(58) Field of Classification Search
CPC ......... F16D 2023/123; F16D 2500/302; F16D 2500/501; F16D 2500/5012; F16D 2500/3022; F16D 2500/5018; F16D 2500/7041; F16D 2500/70418; G01M 13/022
USPC .......................................................... 701/68
See application file for complete search history.

(56) References Cited

U.S. PATENT DOCUMENTS

| | | | |
|---|---|---|---|
| 5,337,874 A * | 8/1994 | Oltean | B60W 10/02 192/111.12 |
| 8,116,956 B2 | 2/2012 | Connolly | |
| 8,160,792 B2 | 4/2012 | Minami | |
| 8,332,110 B2 * | 12/2012 | Vogel | F16D 48/06 701/67 |
| 8,620,513 B2 | 12/2013 | Seufert | |
| 8,831,848 B2 | 9/2014 | Lang | |
| 9,562,576 B2 * | 2/2017 | Hodrus | F16D 48/066 |
| 10,228,029 B2 * | 3/2019 | Nozu | F16D 48/064 |

* cited by examiner

METHOD OF DETERMINING AND PREDICTING A BALL LOSS IN A BALL AND RAMP ASSEMBLY

CROSS-REFERENCE TO RELATED APPLICATIONS

The present application claims the benefit to U.S. Provisional Patent Application No. 62/437,368 filed on Dec. 21, 2016, which is incorporated herein by reference in its entirety.

FIELD OF THE DISCLOSURE

The present disclosure relates to a method of determining a ball loss within ball and ramp assembly and predicting when a ball loss will occur within the ball and ramp assembly.

BACKGROUND OF THE DISCLOSURE

Conventional ball and ramp assemblies are used in a drive unit of a vehicle in order to translate the rotational power generated by a motor into an amount of axial movement which allows the ball and ramp assembly to apply an amount of force onto a clutch pack assembly of the drive unit. The ball and ramp assemblies typically include a first plate having a plurality of first plate grooves, a second plate having a plurality of second plate grooves and a plurality of rolling elements interposed between the first and second plates of the ball and ramp assembly. The plurality of rolling elements interposed are also disposed within the plurality of first and second plate grooves in the first and second plates of the ball and ramp assembly. As the plurality of rolling elements make multiple crossings across the plurality of first and second plate grooves of the first and second plate of the ball and ramp assembly, the rotational movement and acceleration of the plurality of rolling elements tend to lose their desired position and fall back toward their home position. When the plurality of rolling elements lose their desired position and fall back toward their home position, the amount of force applied by the ball and ramp assembly onto the clutch pack assembly is reduced or eliminated. This results a loss in the overall functionality of the ball and ramp assembly and the clutch pack assembly which reduces or eliminates the ability of the clutch pack assembly to provide the desired amount of torque vectoring capability to the drive-line of the vehicle. Because there is no feedback through motor position along to determine whether or not a ball loss has occurred, one or more elaborate detection methods need to be performed in order to determine if a ball loss has occurred. These elaborate detection methods increase the overall costs associated with the drive unit assembly, require more time to perform and tend to provide an undesirable amount of false positives.

It would therefore be advantageous to develop a method of detecting a ball loss within a ball and ramp assembly that is quick, accurate and more cost efficient. Additionally, it would therefore be advantageous to develop a method of predicting when a ball loss will likely occur within a ball and ramp assembly in order to prevent a ball loss from occurring thereby improving the overall operation of a drive unit assembly.

SUMMARY OF THE DISCLOSURE

A method of detecting a ball loss condition in a ball and ramp assembly. The method of detecting the occurrence of a ball loss condition includes providing a drive unit having one or more clutch pack assemblies, one or more ball and ramp assemblies and one or more motors with a motor output shaft that is drivingly connected to at least a portion of the one or more ball and ramp assemblies. During the method of detecting the ball loss condition, one or more actuation profiles are ran by the motors and an amount of motor current used and a position of the output shaft of the motor is measured during the running of actuation profiles. One or more motor current vs. motor output shaft position plots are then generated having one or more characteristic curves based on the amount of motor current measured and the position of the motor output shaft measured during the running of the one or more actuation profiles. The amount of motor current measured is then compared to the amount of current in the characteristic curve at a given motor output shaft position and based on that comparison a ball loss condition is identified.

Additionally, the present disclosure includes disclosure relating to a method of predicting when a ball loss condition will occur within one or more ball and ramp assemblies of a drive unit assembly.

BRIEF DESCRIPTION OF THE FIGURES

The above, as well as other advantages of the present disclosure, will become readily apparent to those skilled in the art from the following detailed description when considered in light of the accompanying drawings in which.

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

The present disclosure relates to a method for determining if a ball loss has occurred within one or more ball and ramp assemblies of a drive unit. Additionally, the present disclosure relates to a method of predicting when a ball loss will occur within the one or more ball and ramp assemblies of the drive unit. As a non-limiting example, the methods described herein may be used in combination with a drive unit, such as but not limited to, a front drive unit, a rear drive unit, a forward tandem axle drive unit, a rear tandem axle drive unit, a differential assembly and/or any other vehicle drive unit having one or more clutching or clutch pack assemblies with one or more ball and ramp assemblies.

It is within the scope of this disclosure, and as a non-limiting example, that the method of detecting and predicting ball loss in one or more ball and ramp assemblies of a drive unit described herein may be used in automotive, off-road vehicle, all-terrain vehicle, construction, structural, marine, aerospace, locomotive, military, machinery, robotic and/or consumer product applications. Additionally, as a non-limiting example, the method of detecting and predicting ball loss in one or more ball and ramp assemblies of a drive unit described herein may also be used in passenger vehicle, electric vehicle, hybrid vehicle, commercial vehicle, autonomous vehicles, semi-autonomous vehicles and/or heavy vehicle applications.

Figure 1:
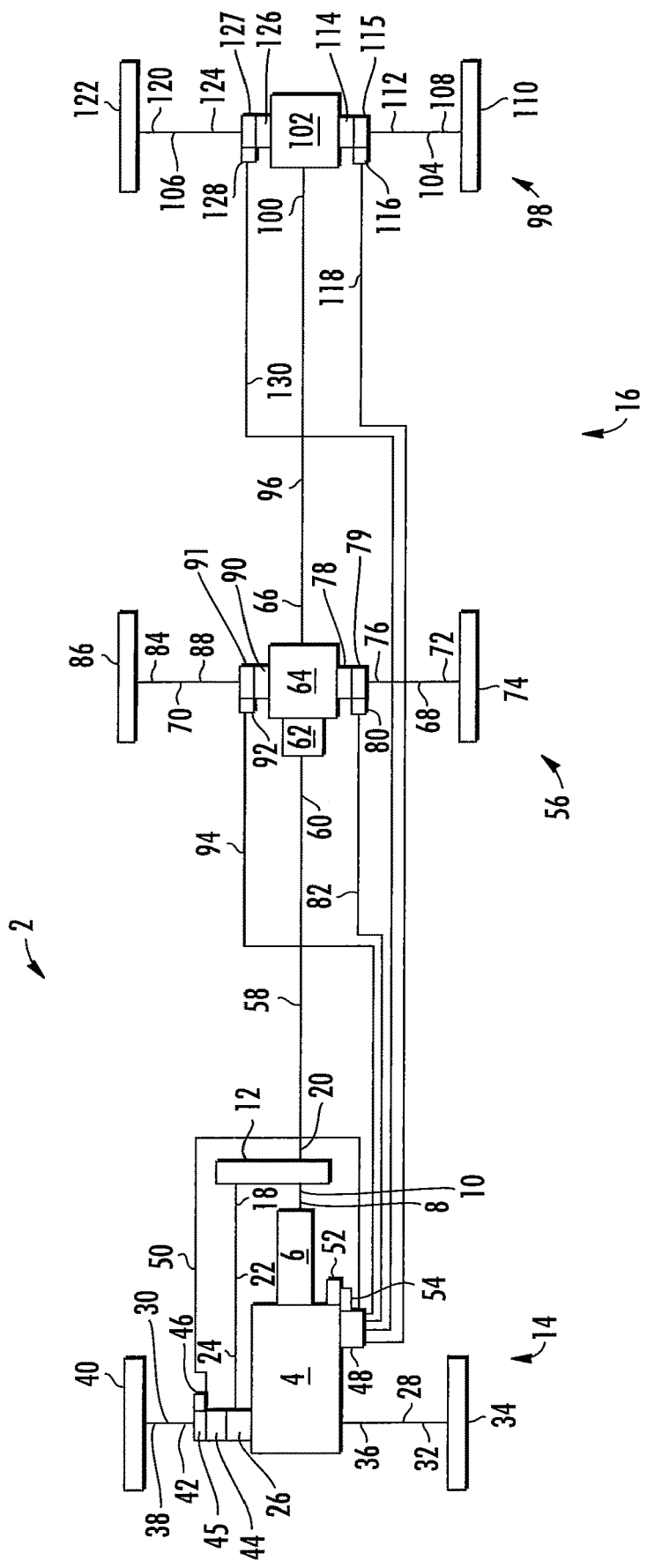
FIG. 1 is a schematic top-plan view of a vehicle having one or more drive units with one or more ball and ramp assemblies utilizing a method of determining if a ball loss has occurred and/or when a ball loss will occur according to an embodiment of the disclosure.

FIG. 1 is a schematic top-plan view of a vehicle 2 having one or more drive units with one or more ball and ramp assemblies utilizing a method of determining if a ball loss has occurred and/or when a ball loss will occur according to an embodiment of the disclosure. As illustrated in FIG. 1 of the disclosure and as a non-limiting example, the 2 has an engine 4 which is drivingly connected to a transmission 6. As non-limiting example, the engine 4 of the vehicle 2 may be an internal combustion engine, an electric motor, a steam turbine and/or a gas turbine. A transmission output shaft 8 is then drivingly connected to an end of the transmission 6 opposite the engine 4. The transmission 6 is a power management system which provides controlled application of the rotational power generated by the engine 4 by means of a gear box.

Drivingly connected to an end of the transmission output shaft 8, opposite the transmission 6, is a transfer case input shaft 10. An end of the transfer case input shaft 10, opposite the transmission output shaft 8, is drivingly connected to at least a portion of a transfer case 12 of the vehicle 2. The transfer case 12 of the vehicle 2 allows for the selective transfer the rotational power from the transmission 6 to a front axle system 14 and a tandem axle system 16 of the vehicle 2 by utilizing a series of gears and drive shafts. As illustrated in FIG. 1 of the disclosure and as a non-limiting example, the transfer case 12 includes a first transfer case output shaft 18 and a second transfer case output shaft 20.

A first shaft 22 extends from the first transfer case output shaft 18 toward the front axle system 14 of the vehicle 2. The first shaft 22 transmits the rotational power from the transfer case 12 to the front axle system 14 of the vehicle 2 thereby drivingly connecting the transfer case 12 to the front axle system 14. It is within the scope of this disclosure and as a non-limiting example that the first shaft 22 may be a drive shaft, a propeller shaft, a Cardan shaft or a double Cardan shaft.

Drivingly connected to an end of the first shaft 22, opposite the first transfer cane output shaft 18, is a front axle system input shaft 24. The front axle system input shaft 24 drivingly connects the first shaft 22 to a front axle differential assembly 26 of the front axle system 14 of the vehicle 2. As illustrated in FIG. 1 of the disclosure and as a non-limiting example, at least a portion of an end of the front axle system input shaft 24, opposite the first shaft 22, is drivingly connected to the front axle differential assembly 26. It is within the scope of this disclosure and as a non-limiting example that the front axle system input shaft 24 may be front differential input shaft, a coupling shaft, stub shaft or a front differential pinion shaft. The front axle differential assembly 26 is a set of gears that allows the outer drive wheel(s) of the vehicle 2 to rotate at a faster rate that the inner drive wheel(s). The rotational power is transmitted through the front axle system 14 as described in more detail below.

The front axle system 14 further includes a first front axle half shaft 28 and a second front axle half shaft 30. As illustrated in FIG. 1 of the disclosure and as a non-limiting example, the first front axle half shaft 28 extends substantially perpendicular to the front axle system input shaft 24 of the vehicle 2. At least a portion of a first end portion 32 of the first front axle half shaft 28 is drivingly connected to a first front axle wheel assembly 34 and at least a portion of a second end portion 36 of the first front axle half shaft 28 is drivingly connected to an end of the front axle differential assembly 26. It is within the scope of this disclosure and as a non-limiting example that the second end portion 36 of the first front axle half shaft 28 may be drivingly connected to a front differential side gear, a separate stub shaft, a separate coupling shaft, a first front axle differential output shaft, a first front axle have shaft connect and disconnect assembly and/or a shaft that is formed as part of a front differential side gear.

Extending substantially perpendicular to the front axle system input shaft 24 is the second front axle half shaft 30 of the vehicle 2. At least a portion of a first end portion 38 of the second front axle half shaft 30 is drivingly connected to a second front axle wheel assembly 40 of the vehicle 2. As illustrated in FIG. 1 of the disclosure and as a non-limiting example, at least a portion of a second end portion 42 of the second front axle half shaft 30 is drivingly connected to an end of the front axle differential assembly 26 opposite the first front axle half shaft 28. It is within the scope of this disclosure and as a non-limiting example that the second end portion 42 of the second front axle half shaft 30 may be drivingly connected to a front differential side gear, a separate stub shaft, a separate coupling shaft, a second front axle differential output shaft, a second front axle half shaft connect and disconnect assembly and/or a shaft that is formed as part of a front differential side gear.

According to the embodiment of the disclosure illustrated in FIG. 1 and as a non-limiting example, the front axle system 14 of the vehicle 2 may further include the use of one or more front axle differential clutch pack assemblies 44. The one or more front axle differential clutch pack assemblies 44 are used to precisely control the amount of torque that is transferred by the engine 4 to the first and/or second front axle wheel assemblies 34 and/or 40 of the vehicle 2. In order to apply an amount of force onto the one or more front axle differential clutch pack assemblies 44, one or more front axle system ball and ramp assemblies 45 are operably connected to at least a portion of the one or more front axle differential clutch pack assemblies 44 of the vehicle 2. The one or more front axle system ball and ramp assemblies 45 are operably configured to apply a variable amount of force onto the one or more front axle differential clutch pack assemblies 44 of the front axle system 14 of the vehicle 2.

In order for the one or more front axle system ball and ramp assemblies 45 to apply a variable amount of force onto the one or more front axle differential clutch pack assemblies 44 of the vehicle 2, a first motor 46 is drivingly connected to at least a portion of the one or more front axle system ball and ramp assemblies 45. It is within the scope of this disclosure and as a non-limiting example that the first motor 46 of the one or more front axle differential clutch pack assemblies 44 may be an electric motor, an actuator, a linear actuator, a pneumatic actuator, a hydraulic actuator, an electro-mechanical actuator, an electro-magnetic actuator and/or any other type or motor that is able to convert an amount of energy into mechanical energy.

The one or more front axle system ball and ramp assemblies 45 and the first motor 46 of the one or more front axle differential clutch pack assemblies 44 of the vehicle 2 are in communication with a control unit 48 via one or more first data-links 50. The one or more first data-links 50 allow for communication between one or more front axle system ball and ramp assemblies 45, the first motor 46 and the control unit 48 of the vehicle 2. As a non-limiting example, the one or more first data-links 50 of the vehicle 2 may be one or more fiber optic cables and/or one or more electrical cables that put the control unit 48 in optical and/or electrical communication with the first motor 46 and the one or more front axle system ball and ramp assemblies 45 of the one or more front axle differential clutch pack assemblies 44.

In accordance with the embodiment of the disclosure illustrated in FIG. 1 and as a non-limiting example, the control unit 48 may be in communication with a vehicle bus 52 via one or more control unit data-links 54. It is within the scope of this disclosure and as a non-limiting example that the vehicle bus 52 may be a Controller Area network (CAN) Bus or a CAN Bus that conforms to the Society of Automotive Engineers (SAE) J-1939 standards. Additionally, it is within the scope of this disclosure and as a non-limiting example that the one or more control unit data-links 54 may be one or more fiber optic cables and/or one or more electrical cables that put the control unit 48 in optical and/or electrical communication with the vehicle bus 52 of the vehicle 2.

An end of the second transfer case output shaft 20 is drivingly connected to an end of the transfer case 12 opposite the transfer case input shaft 10. Extending from the second transfer case output shaft 20 toward a forward tandem axle system 56 of the tandem axle system 16 of the vehicle 2 is a second shaft 58. It is within the scope of this disclosure and as a non-limiting example that the second shaft 58 of the vehicle 2 may be a drive shaft, a propeller shaft, a Cardan shaft or a double Cardan shaft.

Drivingly connected to an end of the second shaft 58, opposite the second transfer case output shaft 20, is a forward tandem axle system input shaft 60. As a non-limiting example, the forward tandem axle input shaft 60 may be a forward tandem axle differential input shaft, a coupling shaft, stub shaft, a forward tandem axle differential pinion shaft, an inter-axle differential input shaft or an inter-axle differential pinion shaft. Drivingly connected to an end of the forward tandem axle input shaft 60, opposite the second shaft 58, is an inter-axle differential assembly 62 of the forward tandem axle system 56 of the vehicle 2. The inter-axle differential assembly 62 is a device that divides the rotational power generated by the engine 4 between the axles in the vehicle 2. The rotational power is transmitted through the forward tandem axle system 56 as described in more detail below.

As illustrated in FIG. 1 of the disclosure and as a non-limiting example, the inter-axle differential assembly 62 of the vehicle 2 is drivingly connected to a forward tandem axle differential assembly 64 and a forward tandem axle system output shaft 66. The forward tandem axle differential assembly 64 is a set of gears that allows the outer drive wheel(s) of the vehicle 2 to rotate at a faster rate than the inner drive wheel(s). The forward tandem axle system 56 of the vehicle 2 further includes a first forward tandem axle half shaft 68 and a second forward tandem axle half shaft 70. As illustrated in FIG. 1 of the disclosure and as a non-limiting example, the first forward tandem axle half shaft 68 extends substantially perpendicular to the forward tandem axle input shaft 60 of the vehicle 2. At least a portion of a first end portion 72 of the first forward tandem axle half shaft 68 is drivingly connected to a first forward tandem axle wheel assembly 74 and at least a portion of a second end portion 76 of the first forward tandem axle half shaft 68 is drivingly connected to an end of the forward tandem axle differential assembly 64. It is within the scope of this disclosure and as a non-limiting example that the second end portion 76 of the first forward tandem axle half shaft 68 may be drivingly connected to a forward tandem axle differential side gear, a separate stub shaft, a separate coupling shaft, a first forward tandem axle differential output shaft, a first forward tandem axle half shaft connect and disconnect assembly and/or a shaft that is formed as part of a forward tandem axle differential side gear.

According to the embodiment of the disclosure illustrated in FIG. 1 and as a non-limiting example, the forward tandem axle system 56 of the vehicle 2 may further include the use of a first forward tandem axle differential clutch pack assembly 78. The first forward tandem axle differential clutch pack assembly 78 is used to precisely control the amount of torque that is transferred by the engine 4 to the first forward tandem axle wheel assembly 74 of the vehicle 2. In order to apply an amount of force onto the first forward tandem axle differential clutch pack assembly 78, a first forward tandem axle system ball and ramp assembly 79 is operably connected to at least a portion of the first forward tandem axle differential clutch pack assembly 78 of the vehicle 2. The first forward tandem axle system ball and ramp assembly 79 is operably configured to apply a variable amount of force onto the first forward tandem axle differential clutch pack assembly 78 of the forward tandem axle system 56 of the vehicle 2.

In order for the first forward tandem axle system ball and ramp assembly 79 to apply a variable amount of force onto the first forward tandem axle differential clutch pack assembly 78 of the vehicle 2, a second motor 80 is drivingly connected to at least a portion of the first forward tandem axle system ball and ramp assembly 79. It is within the scope of this disclosure and as a non-limiting example that the second motor 80 of the first forward tandem axle differential clutch pack assembly 78 may be an electric motor, an actuator, a linear actuator, a pneumatic actuator, a hydraulic actuator, an electro-mechanical actuator, an electro-magnetic actuator and/or any other type or motor that is able to convert an amount of energy into mechanical energy.

The first forward tandem axle system ball and ramp assembly 79 and the second motor 80 of the first forward tandem axle differential clutch pack assembly 78 of the vehicle 2 are in communication with the control unit 48 via one or more second data-links 82. The one or more second data-links 82 allow for communication between first forward tandem axle system ball and ramp assembly 79, the second motor 80 and the control unit 48 of the vehicle 2. As a non-limiting example, the one or more second data-links 82 of the vehicle 2 may be one or more fiber optic cables and/or one or more electrical cables that put the control unit 48 in optical and/or electrical communication with the second motor 80 and the first forward tandem axle system ball and ramp assembly 79 of the first forward tandem axle differential clutch pack assembly 78.

Extending substantially perpendicular to the forward tandem axle system input shaft 60 is the second forward tandem axle half shaft 70 of the vehicle 2. At least a portion of a first end portion 84 of the second forward tandem axle half shaft 70 is drivingly connected to a second forward tandem axle wheel assembly 86 of the vehicle 2. As illustrated in FIG. 1 of the disclosure and as a non-limiting example, at least a portion of a second end portion 88 of the second forward tandem axle half shaft 70 is drivingly connected to an end of the forward tandem axle differential assembly 64 opposite the first forward tandem axle half shaft 68. It is within the scope of this disclosure and as a non-limiting example that the second end portion 88 of the second forward tandem axle half shaft 70 may be drivingly connected to a forward tandem differential side gear, a separate stub shaft, a separate coupling shaft, a second forward tandem axle differential output shaft, a second forward tandem axle half shaft connect and disconnect assembly and/or a shaft that is formed as part of a forward tandem differential side gear.

In accordance with the embodiment of the disclosure illustrated in FIG. 1 and as a non-limiting example, the forward tandem axle system 56 of the vehicle 2 may further include the use of a second forward tandem axle differential clutch pack assembly 90. The second forward tandem axle differential clutch pack assembly 90 is used to precisely control the amount of torque that is transferred by the engine 4 to the second forward tandem axle wheel assembly 86 of the vehicle 2. In order to apply an amount of force onto the second forward tandem axle differential clutch pack assembly 90, a second forward tandem axle system ball and ramp assembly 91 is operably connected to at least a portion of the second forward tandem axle differential clutch pack assembly 90 of the vehicle 2. The second forward tandem axle system ball and ramp assembly 91 is operably configured to apply a variable amount of force onto the second forward tandem axle differential clutch pack assembly 90 of the forward tandem axle system 56 of the vehicle 2.

In order for the second forward tandem axle system ball and ramp assembly 91 to apply a variable amount of force onto the second forward tandem axle differential clutch pack assembly 90 of the vehicle 2, a third motor 92 is drivingly connected to at least a portion of the second forward tandem axle system ball and ramp assembly 90. It is within the scope of this disclosure and as a non-limiting example that the third motor 92 of the second forward tandem axle differential clutch pack assembly 90 may be an electric motor, an actuator, a linear actuator, a pneumatic actuator, a hydraulic actuator, an electro-mechanical actuator, an electro-magnetic actuator and/or any other type or motor that is able to convert an amount of energy into mechanical energy.

The second forward tandem axle system ball and ramp assembly 91 and the third motor 92 of the second forward tandem axle differential clutch pack assembly 90 of the vehicle 2 are in communication with the control unit 48 via one or more third data-links 94. The one or more third data-links 94 allow for communication between second forward tandem axle system ball and ramp assembly 91, the third motor 92 and the control unit 48 of the vehicle 2. As a non-limiting example, the one or more third data-links 94 of the vehicle 2 may be one or more fiber optic cables and/or one or more electrical cables that put the control unit 48 in optical and/or electrical communication with the third motor 92 and the second forward tandem axle system ball and ramp assembly 91 of the second forward tandem axle differential clutch pack assembly 90.

Drivingly connected to an end of the forward tandem axle system output shaft 66, opposite the inter-axle differential assembly 62, is a third shaft 96. The third shaft 96 extends from the forward tandem axle system output shaft 66 toward a rear tandem axle system 98 of the vehicle 2. As a result, the third shaft 98 drivingly connects the inter-axle differential assembly 62 to the rear tandem axle system 98 of the vehicle 2. It is within the scope of this disclosure and as a non-limiting example that the third shaft 98 may be a drive shaft, a propeller shaft, a Cardan Shaft or a double Cardan shaft.

At least a portion of an end of the third shaft 96, opposite the forward tandem axle system output shaft 66, is drivingly connected to an end of a rear tandem axle system input shaft 100. It is within the scope of this disclosure and as a non-limiting example that the rear tandem axle system input shaft 100 may be a rear tandem axle differential input shaft, a coupling shaft, stub shaft or a rear tandem axle differential pinion shaft. Drivingly connected to an end of the rear tandem axle input shaft 100, opposite the third shaft 96, is a rear tandem axle differential assembly 102 of the rear tandem axle system 98 of the vehicle 2. The rear tandem axle differential assembly 102 is a set of gears that allows the outer drive wheel(s) of the vehicle 2 to rotate at a faster rate than the inner drive wheel(s). The rotational power is transmitted through the rear tandem axle system 98 as described in more detail below.

As illustrated in FIG. 1 of the disclosure and as a non-limiting example, the rear tandem axle system 98 further includes a first rear tandem axle half shaft 104 and a second rear tandem axle half shaft 106. The first rear tandem axle half shaft 104 extends substantially perpendicular to the rear tandem axle system input shaft 100 of the vehicle 2. At least a portion of a first end portion 108 of the first rear tandem axle half shaft 104 is drivingly connected to a first rear tandem axle wheel assembly 110 and at least a portion of a second end portion 112 of the first rear tandem axle half shaft 104 is drivingly connected to an end of the rear tandem axle differential assembly 102. It is within the scope of this disclosure and as a non-limiting example that the second end portion 112 of the first rear tandem axle half shaft 104 is drivingly connected to a rear tandem axle differential side gear, a separate stub shaft, a separate coupling shaft, a first rear tandem axle differential output shaft, a first rear tandem axle half shaft connect and disconnect assembly and/or a shaft that is formed as part of a rear tandem axle differential side gear.

According to the embodiment of the disclosure illustrated in FIG. 1 and as a non-limiting example, the rear tandem axle system 98 of the vehicle 2 may further include the use of a first rear tandem axle differential clutch pack assembly 114. The first rear tandem axle differential clutch pack assembly 114 is used to precisely control the amount of torque that is transferred by the engine 4 to the first rear tandem axle wheel assembly 110 of the vehicle 2. In order to apply an amount of force onto the first rear tandem axle differential clutch pack assembly 114, a first rear tandem axle system ball and ramp assembly 115 is operably connected to at least a portion of the first rear tandem axle differential clutch pack assembly 114 of the vehicle 2. The first rear tandem axle system ball and ramp assembly 115 is operably configured to apply a variable amount of force onto the first rear tandem axle differential clutch pack assembly 114 of the rear tandem axle system 98 of the vehicle 2.

In order for the first rear tandem axle system ball and ramp assembly 115 to apply a variable amount of force onto the first rear tandem axle differential clutch pack assembly 114 of the vehicle 2, a fourth motor 116 is drivingly connected to at least a portion of the first rear tandem axle system ball and ramp assembly 115. It is within the scope of this disclosure and as a non-limiting example that the fourth motor 116 of the first rear tandem axle differential clutch pack assembly 114 may be an electric motor, an actuator, a linear actuator, a pneumatic actuator, a hydraulic actuator, an electro-mechanical actuator, an electro-magnetic actuator and/or any other type or motor that is able to convert an amount of energy into mechanical energy.

The first rear tandem axle system ball and ramp assembly 115 and the fourth motor 116 of the first rear tandem axle differential clutch pack assembly 114 of the vehicle 2 are in communication with the control unit 48 via one or more fourth data-links 118. The one or more fourth data-links 118 allow for communication between first rear tandem axle system ball and ramp assembly 115, the fourth motor 116 and the control unit 48 of the vehicle 2. As a non-limiting example, the one or more fourth data-links 118 of the vehicle 2 may be one or more fiber optic cables and/or one or more electrical cables that put the control unit 48 in optical and/or electrical communication with the fourth motor 116 and the first rear tandem axle system ball and ramp assembly 115 of the first rear tandem axle differential clutch pack assembly 114.

Extending substantially perpendicular to the rear tandem axle system input shaft 100 is the second rear tandem axle half shaft 106 of the vehicle 2. At least a portion of a first end portion 120 of the second rear tandem axle half shaft 106 is drivingly connected to a second rear tandem axle wheel assembly 122 of the vehicle 2. As illustrated in FIG. 1 of the disclosure and as a non-limiting example, at least a portion of a second end portion 124 of the second rear tandem axle half shaft 106 is drivingly connected to an end of the rear tandem axle differential assembly 102 opposite the first rear tandem axle half shaft 104. It is within the scope of this disclosure and as a non-limiting example that the second end portion 124 of the second rear tandem axle half shaft 106 may be drivingly connected to a rear tandem differential side gear, a separate stub shaft, a separate coupling shaft, a second rear tandem axle differential output shaft, a second rear tandem axle half shaft connect and disconnect assembly and/or a shaft that is formed as part of a rear tandem differential side gear.

In accordance with the embodiment of the disclosure illustrated in FIG. 1 and as a non-limiting example, the rear tandem axle system 98 of the vehicle 2 may further include the use of a second rear tandem axle differential clutch pack assembly 126. The second rear tandem axle differential clutch pack assembly 126 is used to precisely control the amount of torque that is transferred by the engine 4 to the second rear tandem axle wheel assembly 122 of the vehicle 2. In order to apply an amount of force onto the second rear tandem axle differential clutch pack assembly 126, a second rear tandem axle system ball and ramp assembly 127 is operably connected to at least a portion of the second rear tandem axle differential clutch pack assembly 126 of the vehicle 2. The second rear tandem axle system ball and ramp assembly 127 is operably configured to apply a variable amount of force onto the second rear tandem axle differential clutch pack assembly 126 of the rear tandem axle system 98 of the vehicle 2.

In order for the second rear tandem axle system ball and ramp assembly 127 to apply a variable amount of force onto the second rear tandem axle differential clutch pack assembly 126 of the vehicle 2, a fifth motor 128 is drivingly connected to at least a portion of the second rear tandem axle system ball and ramp assembly 127. It is within the scope of this disclosure and as a non-limiting example that the fifth motor 128 of the second rear tandem axle differential clutch pack assembly 126 may be an electric motor, an actuator, a linear actuator, a pneumatic actuator, a hydraulic actuator, an electro-mechanical actuator, an electro-magnetic actuator and/or any other type or motor that is able to convert an amount of energy into mechanical energy.

The second rear tandem axle system ball and ramp assembly 127 and the fifth motor 127 of the second rear tandem axle differential clutch pack assembly 126 of the vehicle 2 are in communication with the control unit 48 via one or more fifth data-links 130. The one or more fifth data-links 130 allow for communication between second rear tandem axle system ball and ramp assembly 127, the fifth motor 128 and the control unit 48 of the vehicle 2. As a non-limiting example, the one or more fifth data-links 130 of the vehicle 2 may be one or more fiber optic cables and/or one or more electrical cables that put the control unit 48 in optical and/or electrical communication with the fifth motor 128 and the second rear tandem axle system ball and ramp assembly 127 of the second rear tandem axle differential clutch pack assembly 126.

While the embodiment of the disclosure illustrated in FIG. 1 illustrates the motors 46, 80, 92, 116 and 128 and the ball and ramp assemblies 45, 79, 91, 115 and 127 as being in electrical and/or optical communication with the control unit 148, it is within the scope of this disclosure that one or more of the motors 46, 80, 92, 116 and 128 and the ball and ramp assemblies 45, 79, 91, 115 and 127 may be in wireless communication with the control unit 148. As a non-limiting example the wireless communication between the motors 46, 80, 92, 116 and/or 128, the ball and ramp assemblies 45, 79, 91, 115 and/or 127 and the control unit 148 may be a Bluetooth connection, a Wi-fi connection, a cellular connection and/or a radio wave connection. As a result, it is within the scope of this disclosure that the one or more of the motors 46, 80, 92, 116 and/or 128, the ball and ramp assemblies 45, 79, 91, 115 and/or 127 and the control unit 148 may be operably configured to send and/or receive the data and/or instructions needed for the operation of clutch pack assemblies 44, 78, 90, 114 and/or 126 of the vehicle 2. Additionally, as a result, it is within the scope of this disclosure and as a non-limiting example that the motors 46, 80, 92, 116 and/or 128, the ball and ramp assemblies 45, 79, 91, 115 and/or 127 and the control unit 148 may be operably configured to send and/or receive the data and/or instructions needed in order to determine if a ball loss has occurred or to predict when a ball loss will occur within one or more of the ball and ramp assemblies 45, 79, 91, 115 and/or 127.

Furthermore, while the embodiment of the disclosure illustrated in FIG. 1 illustrates the control unit 48 being in electrical and/or optical communication with the vehicle bus 52 of the vehicle 1, it is within the scope of this disclosure that the control unit 48 may be wireless communication with the vehicle bus 52. As a non-limiting example the wireless communication between the control unit 48 and the vehicle bus 52 may be a Bluetooth connection, a Wi-fi connection, a cellular connection and/or a radio wave connection. As a result, it is within the scope of this disclosure that the control unit 48 and the vehicle bus 52 may be operably configured to send and/or receive the data and/or instructions needed for the operation of the clutch pack assemblies 26, 78, 90, 114 and/or 126 of the vehicle 2. Additionally, as a result, it is within the scope of this disclosure and as a non-limiting example that the control unit 48 and the vehicle bus 52 may be operably configured to send and/or receive the data and/or instructions needed in order to determine if a ball loss has occurred or to predict when a ball loss will occur within one or more of the ball and ramp assemblies 45, 79, 91, 115 and/or 127.

It is within the scope of this disclosure and as a non-limiting example that a ball loss within one or more of the ball and ramp assemblies 45, 79, 91, 115 and/or 127 may be determined using a ball loss detection method according to an embodiment of the disclosure. Additionally, it is within the scope of this disclosure and as a non-limiting example that one or more of the ball and ramp assemblies 45, 79, 91, 115 and/or 127 may utilize a method of predicting a ball loss condition according to an embodiment of the disclosure.

Figure 2:
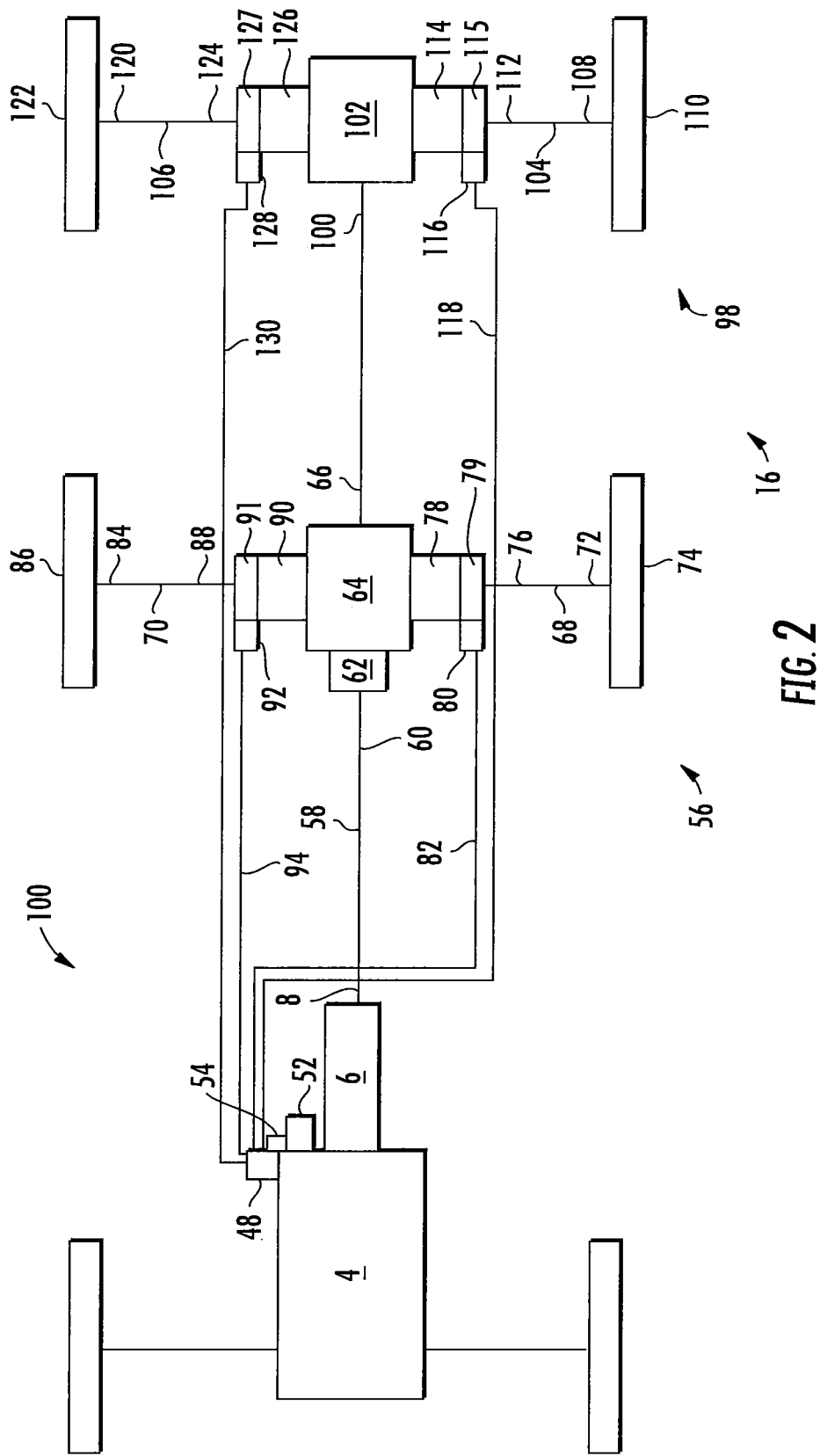
FIG. 2 is a schematic top-plan view of another vehicle having one or more drive units with one or more ball and ramp assemblies utilizing a method of determining if a ball loss has occurred and/or when a ball loss will occur according to an embodiment of the disclosure.

FIG. 2 is a schematic top-plan view of another vehicle 100 having one or more drive units with one or more ball and ramp assemblies utilizing a method of determining if a ball loss has occurred and/or when a ball loss will occur according to an embodiment of the disclosure. The vehicle 100 illustrated in FIG. 2 is the same as the vehicle 2 illustrated in FIG. 1, except where specifically noted below. As illustrated in FIG. 2 of the disclosure and as a non-limiting example, the vehicle 100 does not include the use of the transfer case 12 that is drivingly connected to at least a portion of the front axle system differential assembly 26 having the one or more front axle differential clutch pack assemblies 44.

In accordance with the embodiment of the disclosure illustrated in FIG. 2 and as a non-limiting example, at least a portion of the end of the transmission output shaft 8, opposite the transmission 6, is drivingly connected to at least a portion of the end of the second shaft 58 opposite the forward tandem axle system input shaft 60. As a result, in accordance with the embodiment of the disclosure illustrated in FIG. 2 and as a non-limiting example, the second shaft 58 of the vehicle 100 extends from the transmission output shaft 8 toward the inter-axle differential assembly 62 of the forward tandem axle system 56 of the vehicle 100.

It is within the scope of this disclosure and as a non-limiting example that a ball loss within one or more of the ball and ramp assemblies 79, 91, 115 and/or 127 may be determined using a ball loss detection method according to an embodiment of the disclosure. Additionally, it is within the scope of this disclosure and as a non-limiting example that one or more of the ball and ramp assemblies 79, 91, 115 and/or 127 may utilize a method of predicting a ball loss condition according to an embodiment of the disclosure.

Figure 3:
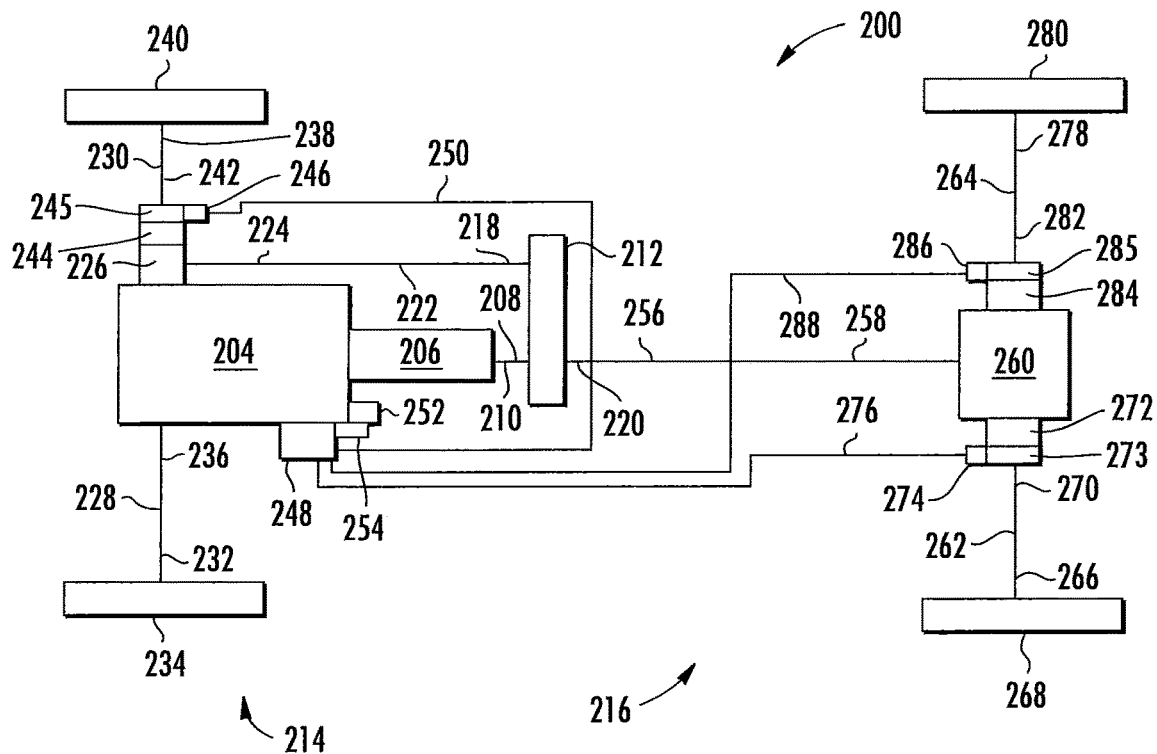
FIG. 3 is a schematic top-plan view of yet another vehicle having one or more drive units with one or more ball and ramp assemblies utilizing a method of determining if a ball loss has occurred and/or when a ball loss will occur according to an embodiment of the disclosure.

FIG. 3 is a schematic top-plan view of yet another vehicle 200 having one or more drive units with one or more ball and ramp assemblies utilizing a method of determining if a ball loss has occurred and/or when a ball loss will occur according to an embodiment of the disclosure. As illustrated in FIG. 3 of the disclosure, the vehicle 200 has an engine 204 which is drivingly connected to a transmission 206. As non-limiting example, the engine 204 of the vehicle 200 may be an internal combustion engine, an electric motor, a steam turbine and/or a gas turbine. A transmission output shaft 208 is then drivingly connected to an end of the transmission 206 opposite the engine 204. The transmission 206 is a power management system which provides controlled application of the rotational power generated by the engine 204 by means of a gear box.

The transmission output shaft 208 is drivingly connected to a transfer case input shaft 210 which in turn is drivingly connected to a transfer case 212. The transfer case 212 is used in four-wheel drive and/or all-wheel-drive (AWD) vehicles to transfer the rotational power from the transmission 206 to a front axle system 214 and a rear axle system 216 by utilizing a series of gears and drive shafts. Additionally, the transfer case 212 allows the vehicle 200 to selectively operate in either a two-wheel drive mode of a four-wheel/AWD drive mode. As illustrated in FIG. 3 of the disclosure and as a non-limiting example, the transfer case 212 includes a first transfer case output shaft 218 and a second transfer case output shaft 220.

A first shaft 222 extends from the first transfer case output shaft 218 toward the front axle system 214 of the vehicle 200. The first shaft 222 transmits the rotational power from the transfer case 212 to the front axle system 214 thereby drivingly connecting the transfer case 212 to the front axle system 214 of the vehicle 200. It is within the scope of this disclosure and as a non-limiting example that the first shaft 222 may be a drive shaft, a propeller shaft, a Cardan shaft or a double Cardan shaft.

Drivingly connected to an end of the first shaft 222, opposite the first transfer cane output shaft 218, is a front axle system input shaft 224. The front axle system input shaft 224 drivingly connects the first shaft 222 to a front axle differential assembly 226 of the front axle system 214 of the vehicle 200. As illustrated in FIG. 3 of the disclosure and as a non-limiting example, at least a portion of an end of the front axle system input shaft 224, opposite the first shaft 222, is drivingly connected to the front axle differential assembly 226 of the vehicle 200. It is within the scope of this disclosure and as a non-limiting example that the front axle system input shaft 224 may be front differential input shaft, a coupling shaft, stub shaft or a front differential pinion shaft. The front axle differential assembly 226 is a set of gears that allows the outer drive wheel(s) of the vehicle 200 to rotate at a faster rate that the inner drive wheel(s). The rotational power is transmitted through the front axle system 214 as described in more detail below.

The front axle system 214 further includes a first front axle half shaft 228 and a second front axle half shaft 230. As illustrated in FIG. 3 of the disclosure and as a non-limiting example, the first front axle half shaft 228 extends substantially perpendicular to the front axle system input shaft 224 of the vehicle 200. At least a portion of a first end portion 232 of the first front axle half shaft 228 is drivingly connected to a first front axle wheel assembly 234 and at least a portion of a second end portion 236 of the first front axle half shaft 228 is drivingly connected to an end of the front axle differential assembly 226. It is within the scope of this disclosure and as a non-limiting example that the second end portion 236 of the first front axle half shaft 228 may be drivingly connected to a front differential side gear, a separate stub shaft, a separate coupling shaft, a first front axle differential output shaft, a first front axle have shaft connect and disconnect assembly and/or a shaft that is formed as part of a front differential side gear.

Extending substantially perpendicular to the front axle system input shaft 224 is the second front axle half shaft 230 of the vehicle 200. At least a portion of a first end portion 238 of the second front axle half shaft 230 is drivingly connected to a second front axle wheel assembly 240 of the vehicle 200. As illustrated in FIG. 3 of the disclosure and as a non-limiting example, at least a portion of a second end portion 242 of the second front axle half shaft 230 is drivingly connected to an end of the front axle differential assembly 226 opposite the first front axle half shaft 228. It is within the scope of this disclosure and as a non-limiting example that the second end portion 242 of the second front axle half shaft 230 may be drivingly connected to a front differential side gear, a separate stub shaft, a separate coupling shaft, a second front axle differential output shaft, a second front axle half shaft connect and disconnect assembly and/or a shaft that is formed as part of a front differential side gear.

According to the embodiment of the disclosure illustrated in FIG. 3 and as a non-limiting example, the front axle system 214 of the vehicle 200 may further include the use of one or more front axle differential clutch pack assemblies 244. The one or more front axle differential clutch pack assemblies 244 are used to precisely control the amount of torque that is transferred by the engine 204 to the first and/or second front axle wheel assemblies 234 and/or 240 of the vehicle 200. In order to apply an amount of force onto the one or more front axle differential clutch pack assemblies 244, one or more front axle system ball and ramp assemblies 245 are operably connected to at least a portion of the one or more front axle differential clutch pack assemblies 244 of the vehicle 200. The one or more front axle system ball and ramp assemblies 245 are operably configured to apply a variable amount of force onto the one or more front axle differential clutch pack assemblies 244 of the front axle system 214 of the vehicle 200.

In order for the one or more front axle system ball and ramp assemblies 245 to apply a variable amount of force onto the one or more front axle differential clutch pack assemblies 244 of the vehicle 200, a first motor 246 is drivingly connected to at least a portion of the one or more front axle system ball and ramp assemblies 245. It is within the scope of this disclosure and as a non-limiting example that the first motor 246 of the one or more front axle differential clutch pack assemblies 244 may be an electric motor, an actuator, a linear actuator, a pneumatic actuator, a hydraulic actuator, an electro-mechanical actuator, an electro-magnetic actuator and/or any other type or motor that is able to convert an amount of energy into mechanical energy.

The one or more front axle system ball and ramp assemblies 245 and the first motor 246 of the one or more front axle differential clutch pack assemblies 244 of the vehicle 200 are in communication with a control unit 248 via one or more first data-links 250. The one or more first data-links 250 allow for communication between one or more front axle system ball and ramp assemblies 245, the first motor 246 and the control unit 248 of the vehicle 200. As a non-limiting example, the one or more first data-links 250 of the vehicle 200 may be one or more fiber optic cables and/or one or more electrical cables that put the control unit 248 in optical and/or electrical communication with the first motor 246 and the one or more front axle system ball and ramp assemblies 245 of the one or more front axle differential clutch pack assemblies 244.

In accordance with the embodiment of the disclosure illustrated in FIG. 3 and as a non-limiting example, the control unit 248 may be in communication with a vehicle bus 252 via one or more control unit data-links 254. It is within the scope of this disclosure and as a non-limiting example that the vehicle bus 252 may be a Controller Area network (CAN) Bus or a CAN Bus that conforms to the Society of Automotive Engineers (SAE) J-1939 standards. Additionally, it is within the scope of this disclosure and as a non-limiting example that the one or more control unit data-links 254 may be one or more fiber optic cables and/or one or more electrical cables that put the control unit 248 in optical and/or electrical communication with the vehicle bus 252 of the vehicle 200.

An end of the second transfer case output shaft 220 is drivingly connected to an end of the transfer case 212 opposite the transfer case input shaft 210. Extending from the second transfer case output shaft 220, toward the rear axle system 216 of the vehicle 200, is a second shaft 256. It is within the scope of this disclosure and as a non-limiting example that the second shaft 256 of the vehicle 200 may be a drive shaft, a propeller shaft, a Cardan shaft or a double Cardan shaft.

Drivingly connected to an end of the second shaft 256, opposite the second transfer case output shaft 220, is a rear axle system input shaft 258. As a non-limiting example, the rear axle input shaft 258 may be a rear axle differential input shaft, a coupling shaft, stub shaft or a rear axle differential pinion shaft. Drivingly connected to an end of the rear axle input shaft 258, opposite the second shaft 256, is a rear axle differential assembly 260 of the rear axle system 216 of the vehicle 200. The rear axle differential assembly 260 is a device that divides the rotational power generated by the engine 204 between the axles in the vehicle 200. The rotational power is transmitted through the rear axle system 216 as described in more detail below.

As illustrated in FIG. 3 of the disclosure and as a non-limiting example, the rear axle system 216 further includes a first rear axle half shaft 262 and a second rear axle half shaft 264. The first rear axle half shaft 262 extends substantially perpendicular to the rear axle system input shaft 258 of the vehicle 200. At least a portion of a first end portion 266 of the first rear axle half shaft 262 is drivingly connected to a first rear axle wheel assembly 268 and at least a portion of a second end portion 270 of the first rear axle half shaft 262 is drivingly connected to an end of the rear axle differential assembly 260. It is within the scope of this disclosure and as a non-limiting example that the second end portion 270 of the first rear axle half shaft 262 is drivingly connected to a rear axle differential side gear, a separate stub shaft, a separate coupling shaft, a first rear axle differential output shaft, a first rear axle half shaft connect and disconnect assembly and/or a shaft that is formed as part of a rear axle differential side gear.

According to the embodiment of the disclosure illustrated in FIG. 3 and as a non-limiting example, the rear axle system 216 of the vehicle 200 may further include the use of a first rear axle differential clutch pack assembly 272. The first rear axle differential clutch pack assembly 272 is used to precisely control the amount of torque that is transferred by the engine 204 to the first rear axle wheel assembly 268 of the vehicle 200. In order to apply an amount of force onto the first rear axle differential clutch pack assembly 272, a first rear axle system ball and ramp assembly 273 is operably connected to at least a portion of the first rear axle differential clutch pack assembly 272 of the vehicle 200. The first rear axle system ball and ramp assembly 273 is operably configured to apply a variable amount of force onto the first rear axle differential clutch pack assembly 272 of the rear axle system 216 of the vehicle 200.

In order for the first rear axle system ball and ramp assembly 273 to apply a variable amount of force onto the first rear axle differential clutch pack assembly 272 of the vehicle 200, a second motor 274 is drivingly connected to at least a portion of the first rear axle system ball and ramp assembly 273. It is within the scope of this disclosure and as a non-limiting example that the second motor 274 of the first rear axle differential clutch pack assembly 272 may be an electric motor, an actuator, a linear actuator, a pneumatic actuator, a hydraulic actuator, an electro-mechanical actuator, an electro-magnetic actuator and/or any other type or motor that is able to convert an amount of energy into mechanical energy.

The first rear axle system ball and ramp assembly 273 and the second motor 274 of the first rear axle differential clutch pack assembly 272 of the vehicle 200 are in communication with the control unit 248 via one or more second data-links 276. The one or more second data-links 276 allow for communication between first rear axle system ball and ramp assembly 273, the second motor 274 and the control unit 248 of the vehicle 200. As a non-limiting example, the one or more second data-links 276 of the vehicle 200 may be one or more fiber optic cables and/or one or more electrical cables that put the control unit 248 in optical and/or electrical communication with the second motor 274 and the first rear axle system ball and ramp assembly 273 of the first rear axle differential clutch pack assembly 272.

Extending substantially perpendicular to the rear axle system input shaft 258 is the second rear axle half shaft 264 of the vehicle 200. At least a portion of a first end portion 278 of the second rear axle half shaft 264 is drivingly connected to a second rear axle wheel assembly 280 of the vehicle 200. As illustrated in FIG. 3 of the disclosure and as a non-limiting example, at least a portion of a second end portion 282 of the second rear axle half shaft 264 is drivingly connected to an end of the rear axle differential assembly 260 opposite the first rear axle half shaft 262. It is within the scope of this disclosure and as a non-limiting example that the second end portion 282 of the second rear axle half shaft 264 may be drivingly connected to a rear differential side gear, a separate stub shaft, a separate coupling shaft, a second rear axle differential output shaft, a second rear axle half shaft connect and disconnect assembly and/or a shaft that is formed as part of a rear differential side gear.

According to the embodiment of the disclosure illustrated in FIG. 3 and as a non-limiting example, the rear axle system 216 of the vehicle 200 may further include the use of a second rear axle differential clutch pack assembly 284. The second rear axle differential clutch pack assembly 284 is used to precisely control the amount of torque that is transferred by the engine 204 to the second rear axle wheel assembly 280 of the vehicle 200. In order to apply an amount of force onto the second rear axle differential clutch pack assembly 284, a second rear axle system ball and ramp assembly 285 is operably connected to at least a portion of the second rear axle differential clutch pack assembly 284 of the vehicle 200. The second rear axle system ball and ramp assembly 285 is operably configured to apply a variable amount of force onto the second rear axle differential clutch pack assembly 284 of the rear axle system 216 of the vehicle 200.

In order for the second rear axle system ball and ramp assembly 285 to apply a variable amount of force onto the second rear axle differential clutch pack assembly 284 of the vehicle 200, a third motor 286 is drivingly connected to at least a portion of the second rear axle system ball and ramp assembly 285. It is within the scope of this disclosure and as a non-limiting example that the third motor 286 of the second rear axle differential clutch pack assembly 284 may be an electric motor, an actuator, a linear actuator, a pneumatic actuator, a hydraulic actuator, an electro-mechanical actuator, an electro-magnetic actuator and/or any other type or motor that is able to convert an amount of energy into mechanical energy.

The second rear axle system ball and ramp assembly 285 and the third motor 285 of the second rear axle differential clutch pack assembly 284 of the vehicle 200 are in communication with the control unit 248 via one or more third data-links 288. The one or more third data-links 288 allow for communication between second rear axle system ball and ramp assembly 285, the third motor 286 and the control unit 248 of the vehicle 200. As a non-limiting example, the one or more third data-links 288 of the vehicle 200 may be one or more fiber optic cables and/or one or more electrical cables that put the control unit 248 in optical and/or electrical communication with the third motor 286 and the second rear axle system ball and ramp assembly 285 of the second rear axle differential clutch pack assembly 284.

While the embodiment of the disclosure illustrated in FIG. 3 illustrates the motors 246, 274 and 286 and the ball and ramp assemblies 245, 273 and 285 as being in electrical and/or optical communication with the control unit 248, it is within the scope of this disclosure that one or more of the motors 246, 274 and 286 and the ball and ramp assemblies 245, 273 and 285 may be in wireless communication with the control unit 248. As a non-limiting example the wireless communication between the motors 246, 274 and/or 286, the ball and ramp assemblies 245, 273 and/or 285 and the control unit 248 may be a Bluetooth connection, a Wi-fi connection, a cellular connection and/or a radio wave connection. As a result, it is within the scope of this disclosure that the one or more of the motors 246, 274 and/or 286, the ball and ramp assemblies 245, 273 and/or 285 and the control unit 248 may be operably configured to send and/or receive the data and/or instructions needed for the operation of clutch pack assemblies 244, 272 and/or 284 of the vehicle 200. Additionally, as a result, it is within the scope of this disclosure and as a non-limiting example that the motors 246, 274 and/or 286, the ball and ramp assemblies 245, 273 and/or 285 and the control unit 248 may be operably configured to send and/or receive the data and/or instructions needed in order to determine if a ball loss has occurred or to predict when a ball loss will occur within one or more of the ball and ramp assemblies 245, 273 and/or 285.

Furthermore, while the embodiment of the disclosure illustrated in FIG. 3 illustrates the control unit 248 being in electrical and/or optical communication with the vehicle bus 252 of the vehicle 200, it is within the scope of this disclosure that the control unit 248 may be wireless communication with the vehicle bus 252. As a non-limiting example the wireless communication between the control unit 248 and the vehicle bus 252 may be a Bluetooth connection, a Wi-fi connection, a cellular connection and/or a radio wave connection. As a result, it is within the scope of this disclosure that the control unit 248 and the vehicle bus 252 may be operably configured to send and/or receive the data and/or instructions needed for the operation of the clutch pack assemblies 244, 272 and/or 284 of the vehicle 200. Additionally, as a result, it is within the scope of this disclosure and as a non-limiting example that the control unit 248 and the vehicle bus 252 may be operably configured to send and/or receive the data and/or instructions needed in order to determine if a ball loss has occurred or to predict when a ball loss will occur within one or more of the ball and ramp assemblies 245, 273 and/or 285.

It is within the scope of this disclosure and as a non-limiting example that a ball loss within one or more of the ball and ramp assemblies 245, 273 and/or 285 may be determined using a ball loss detection method according to an embodiment of the disclosure. Additionally, it is within the scope of this disclosure and as a non-limiting example that one or more of the ball and ramp assemblies 245, 273 and/or 285 may utilize a method of predicting a ball loss condition according to an embodiment of the disclosure.

Figure 4:
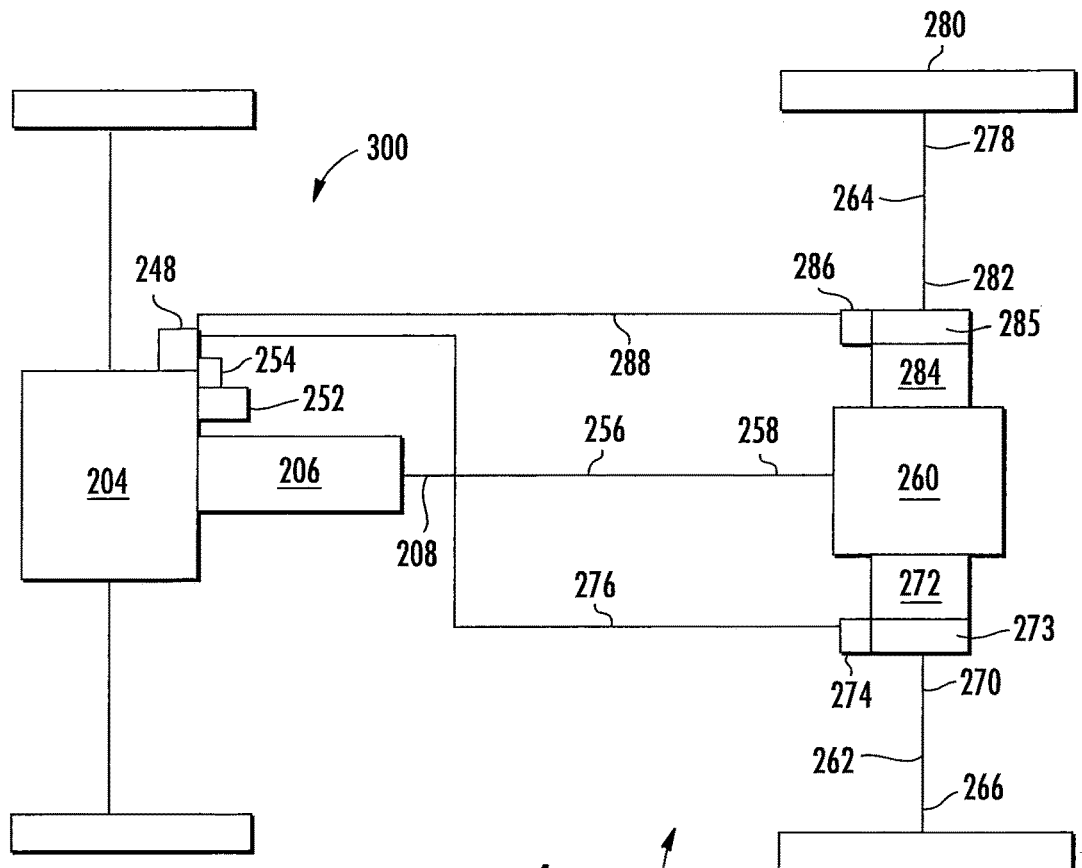
FIG. 4 is a schematic top-plan view of still yet another vehicle having one or more drive units with one or more ball and ramp assemblies utilizing a method of determining if a ball loss has occurred and/or when a ball loss will occur according to an embodiment of the disclosure.

FIG. 4 is a schematic top-plan view of still yet another vehicle 300 having one or more drive units with one or more ball and ramp assemblies utilizing a method of determining if a ball loss has occurred and/or when a ball loss will occur according to an embodiment of the disclosure. The vehicle 300 illustrated in FIG. 4 is the same as the vehicle 200 illustrated in FIG. 2, except where specifically noted below. As illustrated in FIG. 4 of the disclosure and as a non-limiting example, the vehicle 300 does not include the use of the transfer case 212 that is drivingly connected to at least a portion of the front axle system differential assembly 226 having the one or more front axle differential clutch pack assemblies 244.

In accordance with the embodiment of the disclosure illustrated in FIG. 3 of the disclosure and as a non-limiting example, at least a portion of the end of the transmission output shaft 208, opposite the transmission 206, is drivingly connected to at least a portion of the end of the second shaft 265 opposite the rear axle system input shaft 258. As a result, in accordance with the embodiment of the disclosure illustrated in FIG. 4 and as a non-limiting example, the second shaft 256 of the vehicle 300 extends from the transmission output shaft 208 toward the rear axle differential assembly 260 of the rear axle system 216 of the vehicle 300.

It is within the scope of this disclosure and as a non-limiting example that a ball loss within one or more of the ball and ramp assemblies 273 and/or 285 may be determined using a ball loss detection method according to an embodiment of the disclosure. Additionally, it is within the scope of this disclosure and as a non-limiting example that one or more of the ball and ramp assemblies 273 and/or 285 may utilize a method of predicting a ball loss condition according to an embodiment of the disclosure.

Figure 5:
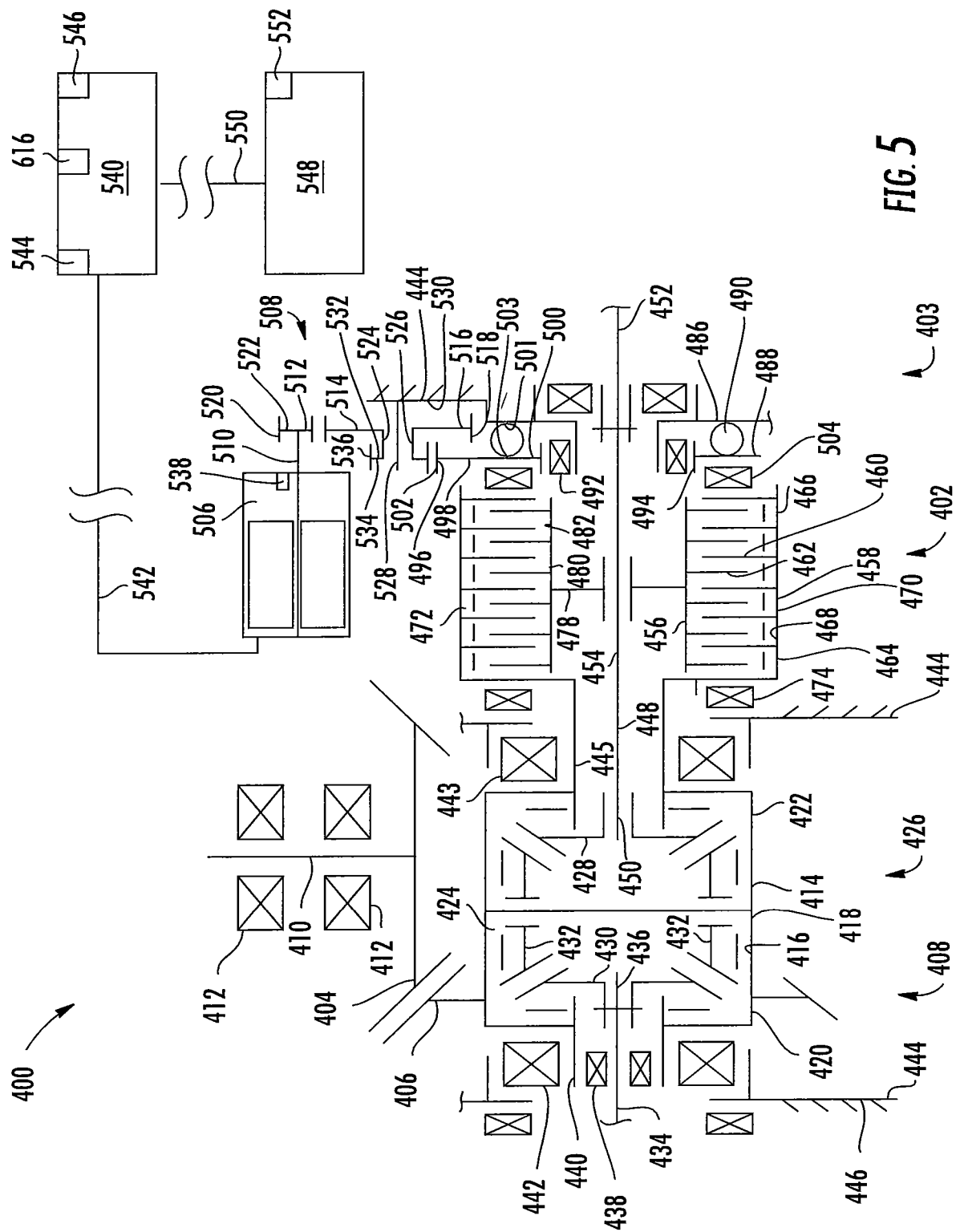
FIG. 5 is a schematic top-plan view of a drive unit assembly with one or more clutch pack assemblies with one or more ball and ramp assemblies according to an embodiment of the disclosure.

FIG. 5 is a schematic top-plan view of a drive unit assembly 400 with one or more clutch pack assemblies 402 with one or more ball and ramp assemblies 403 according to an embodiment of the disclosure. As illustrated in FIG. 5 of the disclosure and as a non-limiting example, the drive unit assembly 400 includes a pinion gear 404 that is drivingly connected to and meshingly engaged with a ring gear 406 of a differential assembly 408. At least a portion of a pinion gear shaft 410 is rotationally supported within one or more pinion shaft bearings 412 of the drive unit assembly 400. It is within the scope of this disclosure and as a non-limiting example that the differential assembly 408 of the drive unit assembly 400 may be a front axle differential assembly, a rear axle differential assembly, a forward tandem axle differential assembly and/or a rear tandem axle differential assembly of a vehicle (not shown).

At least a portion of an end of the pinion shaft 410, opposite the pinion gear 404 is drivingly connected to a source of rotational power (not shown). It is within the scope of this disclosure and as a non-limiting example that the source (not shown) may be an engine, a transmission, a transfer case, a propeller shaft a drive shaft, universal joint assembly and/or a constant velocity joint assembly.

Drivingly connected to at least a portion of the ring gear 408 of the differential assembly 408 is a differential case 414 having an inner surface 416, an outer surface 418, a first end portion 420 and a second end portion 422. The inner surface 416 and the outer surface 418 of the differential case 414 defines a hollow portion 424 therein. Disposed with in at least a portion of the hollow portion 424 of the differential case 414 is a differential gear set 426 having a first side gear 428, a second side gear 430 and one or more bevel gears 432 that are drivingly and meshingly engaged with the first and second side gears 428 and 430 of the differential gear set 426.

Extending co-axially with at least a portion of the second side gear 430 of the differential assembly 408 is a second axle half shaft 434 having a first end portion (not shown) and a second end portion 436. As illustrated in FIG. 5 and as a non-limiting example, at least a portion of the second end portion 436 of the second axle half shaft 434 is drivingly connected to at least a portion of the second side gear 430 of the differential assembly 408. At least a portion of the first end portion (not shown) of the second axle half shaft 434 is drivingly connected to at least a portion of a second wheel assembly (not shown). It is within the scope of this disclosure and as a non-limiting example that the second axle half shaft 434 may be a second front axle half shaft, a second rear axle half shaft, a second forward tandem axle half shaft and/or a second rear tandem axle half shaft.

At least a portion of the second axle half shaft 434 is rotationally supported by a second axle half shaft bearing 438. In accordance with the embodiment of the disclosure illustrated in FIG. 8 and as a non-limiting example, at least a portion of the second axle half shaft bearing 438 is interposed between the second axle half shaft 434 and first reduced diameter portion 440 of the differential case 414. The first reduced diameter portion 440 of the differential case 414 extends axially outboard from at least a portion of the first end portion 420 of the differential case 414.

Disposed radially outboard from at least a portion of the first reduced diameter portion 440 of the differential case 414 is a first differential case bearing 442. As illustrated in FIG. 5 of the disclosure and as a non-limiting example, at least a portion of the first differential case bearing 442 is interposed between the differential case 414 and an inner surface 444 of a housing 446 of the drive unit assembly 400. The first differential case bearing 442 of the drive unit assembly 400 provides rotational support for at least a portion of the first end portion 420 of the differential case 414. Additionally, it is within the scope of this disclosure and as a non-limiting example the first differential case bearing 442 may also provide axial load support for the differential case 414 allowing for rotation of the differential case 414 relative to the housing 446 of the drive unit assembly 400 when in operation.

A second differential case bearing 443 is interposed between the outer surface 418 of a second reduced diameter portion 445 of the differential case 414 and the inner surface 444 the housing 446 of the drive unit assembly 400. In accordance with the embodiment of the disclosure illustrated in FIG. 5 and as a non-limiting example, the second reduced diameter portion 445 of the differential case 414 extends axially outboard from at least a portion of the second end portion 422 of the differential case 414. The second differential case bearing 443 of the drive unit assembly 400 provides rotational support for at least a portion of the second end portion 422 of the differential case 414. Additionally, it is within the scope of this disclosure and as a non-limiting example the second differential case bearing 443 may also provide axial load support for the differential case 414 allowing for rotation of the differential case 414 relative to the housing 446 of the drive unit assembly 400 when in operation.

Extending co-axially with at least a portion of the first side gear 428 of the differential assembly 408 is a first axle half shaft 448 having a first end portion 450, a second end portion 452 and an intermediate portion 454 interposed between the first and second end portions 450 and 452 of the first axle half shaft 448. As illustrated in FIG. 5 of the disclosure and as a non-limiting example, at least a portion of the first end portion 450 of the first axle half shaft 448 is drivingly connected to at least a portion of the first side gear 428 of the differential assembly 408 of the drive unit assembly 400. At least a portion of the second end portion 452 of the first axle half shaft 448 is drivingly connected to at least a portion of a first wheel assembly (not shown). It is within the scope of this disclosure and as a non-limiting example that the first axle half shaft 448 may be a first front axle half shaft, a first rear axle half shaft, a first forward tandem axle half shaft and/or a first rear tandem axle half shaft.

Drivingly connected to at least a portion of the first axle half shaft 448 and the differential case 414 of the differential assembly 408 is the one or more clutch pack assemblies 402 of the drive unit assembly 400. As illustrated in FIG. 5 of the disclosure and as a non-limiting example, the one or more clutch pack assemblies 402 have a clutch can 456, a clutch drum 458, a first plurality of clutch plates 460 and a second plurality of clutch plates 462. At least a portion of the clutch drum 458 of the one or more clutch pack assemblies 402 extends co-axially with at least a portion of the first axle half shaft 448 and the differential case 414. The clutch drum 458 has a first end portion 464, a second end portion 466, an inner surface 468 and an outer surface 470 defining a hollow portion 472 therein. In accordance with the embodiment of the disclosure illustrated in FIG. 5 and as a non-limiting example, at least a portion of the first end portion 464 of the clutch drum 458 is integrally connected to at least a proton of the second end portion 422 of the differential case 414.

Interposed between the first end portion 464 of the clutch drum 458 and the housing 446 is a first thrust bearing 474. The first thrust bearing 474 of the one or more clutch pack assemblies 402 of the drive unit assembly 400 allows for relative rotation and reduces the overall amount of friction between the clutch drum 458 and the housing 446 of the drive unit assembly 400.

Drivingly connected to at least a portion of the inner surface 468 of the clutch drum 458 of the one or more clutch pack assemblies 402 is the first plurality of clutch plates 460. Additionally, the first plurality of clutch plates 460 of the one or more clutch pack assemblies 402 are mounted to the clutch drum 458 so as to allow the first plurality of clutch plates 460 to slide axially along the inner surface 468 of the clutch drum 458 while remaining drivingly connected to the clutch drum 458.

Extending co-axially with at least a portion of the first axle half shaft 448 and the clutch drum 458 is the clutch can 456 of the one or more clutch pack assemblies 402 of the drive unit assembly 400. As illustrated in FIG. 5 of the disclosure and as a non-limiting example, at least a portion of the clutch can 456 of the one or more clutch pack assemblies 402 is disposed within the hollow portion 472 of the clutch drum 458. A radially extending portion 478 extends radially inward from at least a portion of an inner surface 480 of the clutch can 456 of the one or more clutch pack assemblies 402. An end of the radially extending portion 478, opposite the clutch can 456, is drivingly connected to at least a portion of the intermediate portion 454 of the first axle half shaft 448 of the drive unit assembly 400. It is within the scope of this disclosure and as a non-limiting example that the radially extending portion 478 of the clutch can 456 may be connected to at least a portion of the first axle half shaft 448 by using one or more mechanical fasteners, one or more adhesives, one or more welds, a spline connection and/or a threaded connection.

Drivingly connected to at least a portion of an outer surface 482 of the clutch can 656 of the one or more clutch pack assemblies 402 is the second plurality of clutch plates 462. Additionally, the second plurality of clutch plates 462 of the one or more clutch pack assemblies 462 are mounted to the clutch can 456 so as to allow the second plurality of clutch plates 462 to slide axially along the outer surface 482 of the clutch can 456 while remaining drivingly connected to the clutch can 456. As illustrated in FIG. 5 of the disclosure and as a non-limiting example, the second plurality of clutch plates 462 are interleafed with the first plurality of clutch plates 460 of the one or more clutch pack assemblies 402. It is within the scope of this disclosure and as a non-limiting example that the one or more clutch pack assemblies 402 may further include the use of one or more biasing members (not shown) that are interposed between one or more of the first and second plurality of clutch plates 460 and 462.

Disposed axially outboard from at least a portion of the clutch can 456 and the clutch drum 458 is the one or more ball and ramp assemblies 403 of the one or more clutch pack assemblies 402 of the drive unit assembly 400. The one or more ball and ramp assemblies 403 are selectively engageable with the first and/or second plurality of clutch plates 460 and/or 462 of the one or more clutch pack assemblies 402. In accordance with the embodiment of the disclosure illustrated in FIG. 5 and as a non-limiting example, the one or more ball and ramp assemblies 403 includes a first plate 486, a second plate 488 and one or more balls 490 interposed between the first plate 486 and the second plate 488.

The first plate 486 of the one or more ball and ramp assemblies 403 resists the axial force applied thereto thereby allowing the second plate 488 to translate axially toward the first and second plurality of clutch plates 460 and 462 of the one or more clutch pack assemblies 402 of the drive unit assembly 400. It is within the scope of this disclosure and as a non-limiting example that the first plate 486 of the one or more ball and ramp assemblies 403 may be rotatable, non-rotatable and integrally connected to at least a portion of the housing 446 or non-rotatable and forms a part of the housing 446 of the drive unit assembly 400. Additionally, it is within the scope of this disclosure and as a non-limiting example that the first plate 486 of the one or more ball and ramp assemblies 403 may be a pressure plate.

Interposed between the second plate 488 and the first plate 486 of the one or more ball and ramp assemblies 403 or between the second plate 488 and the housing 446 of the drive unit assembly 400 is a bearing 492. The bearing 492 allows for relative rotation of the second plate 488 and the first plate 486 and/or the housing 446 of the drive unit assembly 400 when in operation.

As illustrated in FIG. 5 of the disclosure and as a non-limiting example, the second plate 488 of the one or more ball and ramp assemblies 403 has an inner surface 494, an outer surface 496 a first side 498 and a second side 500. Circumferentially extending along at least a portion of the outer surface 496 of the second plate 488 of the one or more ball and ramp assemblies 403 is a plurality of actuator plate teeth 502. It is within the scope of this disclosure and as a non-limiting example that the second plate 488 of the one or more ball and ramp assemblies 403 may be an actuator plate.

At least a portion of one or more of the one or more balls 490 of the one or more ball and ramp assemblies 403 are disposed within one or more first plate grooves 501 in the first plate 486 and one or more second plate grooves 503 in the second plate 488. The one or more first and second plate grooves 501 in the first plate 486 are complementary to the one or more second plate grooves 503 in the second plate 488 of the one or more ball and ramp assemblies 403 of the drive unit assembly 400. Additionally, the one or more second plate grooves 503 are in the second side 500 of the second plate 488 and the one or more first plate grooves 501 are in a side of the first plate 486 facing the second plate 488 of the one or more ball and ramp assemblies 403. Furthermore, the one or more first plate grooves 501 and the one or more second plate grooves 503 have a variable depth such that when the second plate 488 is rotated, the second plate 488 is translated axially away from the first plate 486 toward the first and second plurality of clutch plates 460 and 462 of the one or more clutch pack assemblies 402 of the drive unit assembly 400. It is within the scope of this disclosure and as a non-limiting example that the one or more first and second plate grooves 501 and 503 in the first and second plates 486 and 488 may be disposed along one or more fixed or variable radii from the theoretical center of the first and second plates 486 and 488 of the one or more ball and ramp assemblies 403.

Interposed between the second plate 488 and the first and second plurality of clutch plates 460 and 462 of the one or more clutch pack assemblies 402 is a second thrust bearing 504. The second thrust bearing 504 of the one or more clutch pack assemblies 402 of the drive unit assembly 400 allows for relative rotation and reduces the overall amount of friction between the second plate 488 and the first and second plurality of clutch plates 460 and 462 of the one or more clutch pack assemblies 402. When in operation, the second plate 488 will translate the second thrust bearing 504 axially toward the first and second plurality of clutch plates 460 and 462 until at least a portion of the second thrust bearing 504 is in direct contact with at least a portion of the first and/or second plurality of clutch plates 460 and 462. Once the second thrust bearing 504 is in direct contact with the first and/or second plurality of clutch plates 460 and 462, the force from the second plate 488 will be transmitted to the first and second plurality of clutch plates 460 and 462 via the second thrust bearing 504. This allows the one or more clutch pack assemblies 402 of the drive unit assembly 400 to precisely control the amount of torque that is transferred by an engine (not shown) to the wheel assemblies (not shown) of the vehicle (not shown).

Disposed radially outboard from at least a portion of the second plate 488 of the one or more ball and ramp assemblies 403 is one or more motors 506 and one or more gear sets 508. Drivingly connected to at least a portion of the one or more motors 506 of the drive unit assembly 400 is a motor output shaft 510. It is within the scope of this disclosure and as a non-limiting example that the one or more motors 506 may be an electric motor, an actuator, a linear actuator, a pneumatic actuator, a hydraulic actuator, an electro-mechanical actuator, an electro-magnetic actuator and/or any other type or motor that is able to convert an amount of energy into mechanical energy.

At least a portion of an end of the motor output shaft 510, opposite the one or more motors 506, is drivingly connected to at least a portion of a first gear 512 of the one or more gear sets 508. It is within the scope of this disclosure and as a non-limiting example that the first gear 512 may be connected to at least a portion of the motor output shaft 510 by using one or more mechanical fasteners, one or more welds, one or more adhesives, a splines connection and/or a threaded connection.

A second or intermediate gear 514 of the one or more gear sets 508 is drivingly connected to and disposed radially inboard from at least a portion of the first gear 512 of the one or more gear sets 508. Circumferentially extending from at least a portion of an outer surface 516 of the second or intermediate gear 514 is a plurality of second gear teeth 518. The plurality of second gear teeth 518 of the second or intermediate gear 514 are complementary to and meshingly engaged with a plurality of first gear teeth 520 circumferentially extending from at least a portion of an outer surface 522 of the first gear 512.

Drivingly connected to at least a portion of an inner surface 524 of the second or intermediate gear 514 is a gear shaft 526. At least a portion of the gear shaft 526 of the one or more gear sets 508 is rotationally supported by a support shaft 528. As illustrated in FIG. 5 of the disclosure and as a non-limiting example, the support shaft 528 extends axially inboard from at least a portion of an inner surface 530 of the housing 446 of the drive unit assembly 400. It is within the scope of this disclosure and as a non-limiting example that at least a portion of the support shaft 528 may be integrally connected to at least a portion of the inner surface 530 of the housing 446 by using one or more mechanical fasteners, one or more welds, one or more adhesives and/or by using a threaded connection. Additionally, it is within the scope of this disclosure and as a non-limiting example that the support shaft 528 may be integrally formed as part of the inner surface 530 of the housing 546 of the drive unit assembly 500.

As illustrated in FIG. 5 of the disclosure and as a non-limiting example, at least a portion of a third gear 532 is drivingly connected to at least a portion of an end of the gear shaft 526 opposite the second or intermediate gear 514 of the one or more gear sets 508. Circumferentially extending along at least a portion of an outer surface 534 of the third gear 532 is a plurality of third gear teeth 536. The plurality of third gear teeth 536 of the third gear 532 are complementary to and meshingly engaged with the plurality of actuator plate teeth 502 of the second plate 488 of the one or more ball and ramp assemblies 403. As a result, the third gear 532 drivingly connects the one or more motors 506 to the second plate 488 of the one or more ball and ramp assemblies 403 of the drive unit assembly 400.

In accordance with the embodiment of the disclosure illustrated in FIG. 5 and as a non-limiting example, the one or more motors 506 of the drive unit assembly 400 may further include the use of one or more first sensors 538. The one or more first sensors 538 of the one or more motors 506 are disposed radially outboard from at least a portion of the motor output shaft 510 and are operably configured to detect and/or determine the position of the motor output shaft 510. It is within the scope of this disclosure and as a non-limiting example that the one or more first sensors 538 of the one or more motors 506 may be one or more Hall Effect sensors, one or more Hall sensors, one or more rotary encoders, one or more proximity sensors, one or more capacitive displacement sensors and/or any other type of sensor that is able to detect and/or determine the position of the motor output shaft 510 of the drive unit assembly 400.

The one or more motors 506 and the one or more first sensors 538 in the one or more motors 506 are in communication with one or more control units 540 via one or more motor data-links 542. The one or more motor data-links 542 allow for communication between the one or more motors 506 and the one or more control units 540. Additionally, the one or more motor data-links 542 allow for communication between the one or more first sensors 538 of the one or more motors 506 and the one or more control units 540. As a non-limiting example the one or more motor data-links 542 may be one or more fiber optic cables and/or one or more electrical cables that put the one or more control units 540 in optical and/or electrical communication with the one or more motors 506 and the one or more first sensors 538 of the one or more motors 506.

As illustrated in FIG. 5 of the disclosure and as a non-limiting example, the one or more control units 540 may further include the use of one or more second sensors 544 and/or one or more data processors 546. The one or more second sensors 544 of the one or more control units 540 are operably configured to detect and/or determine the amount of current being supplied to the motor 502 of the drive unit assembly 400. It is within the scope of this disclosure and as a non-limiting example that the one or more second sensors 544 of the one or more control units 540 may be one or more Hall Effect current sensors, one or more Hall current sensors, one or more resistors and/or any other type of sensor that is able to detect and/or determine the amount of electrical current in one or more wires supplying the one or more motors 506 with power.

The one or more data processors 546 of the one or more control units 540 are operably configured to collect and/or analyze the data collected by the one or more first and second sensors 538 and 544 in order to determine whether or not a ball loss has occurred within the one or more ball and ramp assemblies 403 of the drive unit assembly 400. Additionally, the one or more data processors 546 of the one or more control units 540 are operably configured to collect and/or analyze the data collected by the one or more first and second sensors 538 and 544 in order to predict when a ball loss will occur within the one or more ball and ramp assemblies 403 of the drive unit assembly 400. It is therefore within the scope of this disclosure and as a non-limiting example that the one or more control units 540 may be operably configured to determine and/or predict a ball loss condition within the one or more ball and ramp assemblies 403 of the drive unit assembly 400.

In accordance with the embodiment of the disclosure illustrated in FIG. 5 of the disclosure and as a non-limiting example, the one or more control units 540 may be in communication with a vehicle bus 548 via one or more control unit data-links 550. The one or more control unit data-links 550 allow for communication between the one or more control units 540 and the vehicle bus 550. Additionally, the one or more control unit data-links 550 allow for communication between the one or more first sensors 538 of the one or more motors 506 and the one or more control units 540 and the vehicle bus 548. As a non-limiting example the one or more control unit data-links 550 may be one or more fiber optic cables and/or one or more electrical cables that put the vehicle bus 548 in optical and/or electrical communication with the one or more control units 540, the one or more second sensors 544 of the one or more control units 540 and the one or more first sensors 538 of the one or more motors 506. It is within the scope of this disclosure and as a non-limiting example that the vehicle bus 548 may be a CAN Bus or a CAN Bus that conforms to the SAE J-1939 standards.

As illustrated in FIG. 5 of the disclosure and as a non-limiting example, the vehicle bus 548 may further include the use of one or more data processors 552 that are operably configured to collect and/or analyze the data collected from the one or more first and second sensors 438 and 444 in order to determine whether or not a ball loss has occurred within the one or more ball and ramp assemblies 403 of the drive unit assembly 400. Additionally, as illustrated in FIG. 5 of the disclosure and as a non-limiting example, the vehicle bus 548 may further include the use of one or more data processors 552 that are operably configured to collect and/or analyze the data collected from the one or more first and second sensors 438 and 444 in order to predict when a ball loss will occur within the one or more ball and ramp assemblies 403 of the drive unit assembly 400. It is therefore within the scope of this disclosure and as a non-limiting example that the vehicle bus 548 may be operable configured to determine and/or predict a ball loss condition within the one or more ball and ramp assemblies 403 of the drive unit assembly 400. As a result, it is within the scope of this disclosure and as a non-limiting example that the one or more control units 540 and/or the vehicle bus 548 may be used in order to determine and/or predict a ball loss condition within the one or more ball and ramp assemblies 403 of the drive unit assembly 400.

While the embodiment of the disclosure illustrated in FIG. 5 illustrates the one or more motors 506 and the one or more first sensors 538 as being in electrical and/or optical communication with the one or more control units 540, it is within the scope of this disclosure that the one or more motors 506 and the one or more first sensors 538 may be in wireless communication with the one or more control units 540. As a non-limiting example the wireless communication between the one or more motors 506 and the one or more first sensors 538 and the one or more control units 540 may be a Bluetooth connection, a Wi-fi connection, a cellular connection and/or a radio wave connection. As a result, it is within the scope of this disclosure that the one or more motors 506, the one or more first sensors 538 and the one or more control units 540 may be operably configured to send and/or receive the data and/or instructions needed for the operation of the one or more clutch pack assemblies 402 of the drive unit 400. Additionally, it is therefore within the scope of this disclosure and as a non-limiting example that the one or more motors 506, the one or more first sensors 538 and the one or more control units 540 may be operably configured to send and/or receive the data and/or instructions needed in order to determine and/or predict a ball loss condition within the one or more ball and ramp assemblies 403 of the drive unit assembly 400.

Furthermore, while the embodiment of the disclosure illustrated in FIG. 5 illustrates the one or more control units 540 being in electrical and/or optical communication with the vehicle bus 548, it is within the scope of this disclosure that the one or more control units 540, the one or more motors 506, the one or more first sensors 538 and the one or more second sensors 544 may be wireless communication with the vehicle bus 548. As a non-limiting example the wireless communication between the one or more control units 540, the one or more motors 506, the one or more first sensors 538 and the one or more second sensors 544 and the vehicle bus 548 may be a Bluetooth connection, a Wi-fi connection, a cellular connection and/or a radio wave connection. As a result, it is within the scope of this disclosure that the one or more control units 540, the one or more motors 506, the one or more first sensors 538, the one or more second sensors 544 and/or the vehicle bus 548 may be operably configured to send and/or receive the data and/or instructions needed for the operation of the one or more clutch pack assemblies 402. Additionally, it is therefore within the scope of this disclosure and as a non-limiting example that the one or more control units 540 and/or the vehicle bus 548 may be operably configured to send and/or receive the data and/or instructions needed in order to determine and/or predict a ball loss condition within the one or more ball and ramp assemblies 403 of the drive unit assembly 400.

Figure 6:
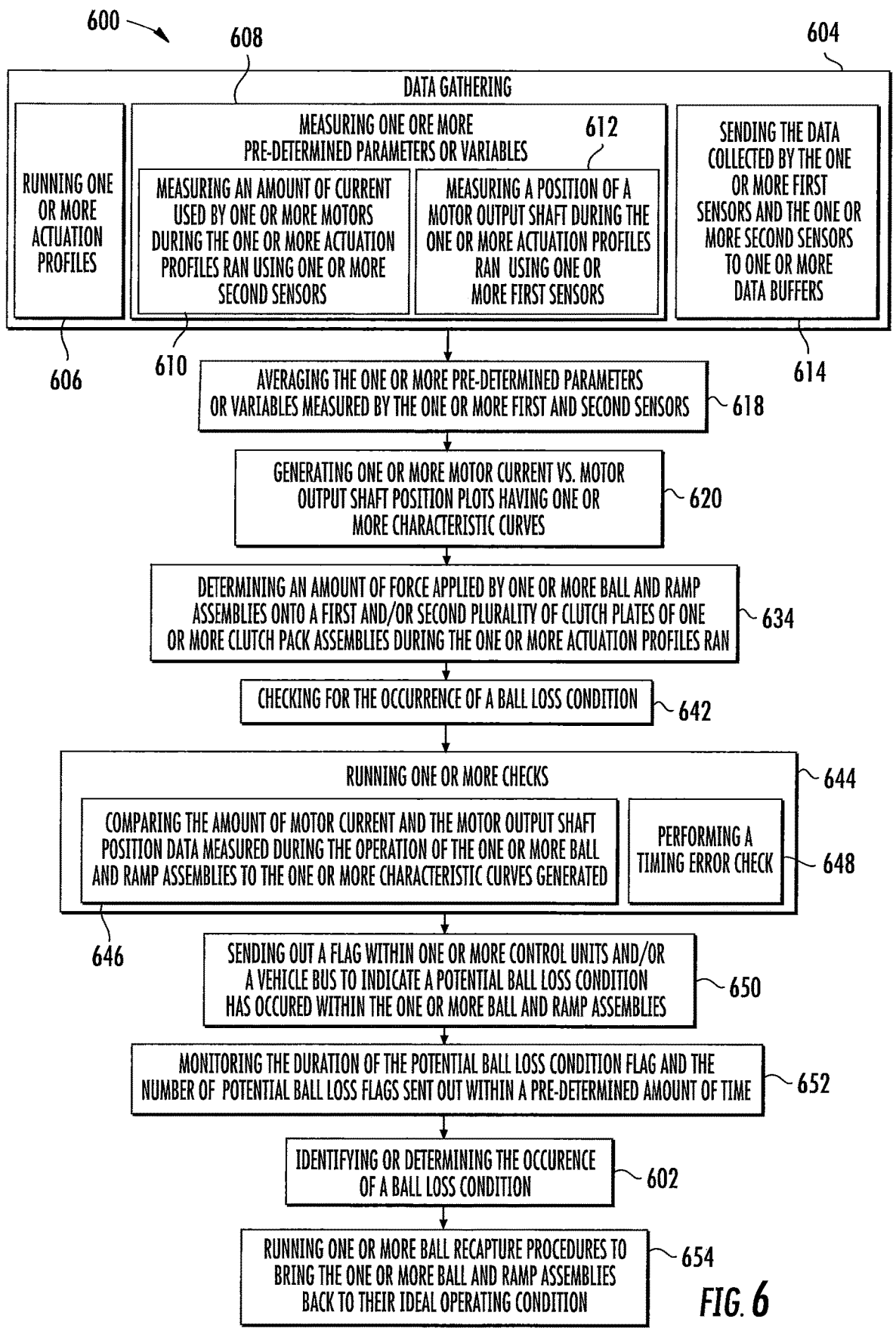
FIG. 6 is a flow-chart illustrating a method of detecting a ball loss condition according to an embodiment of the disclosure.
Figure 7:
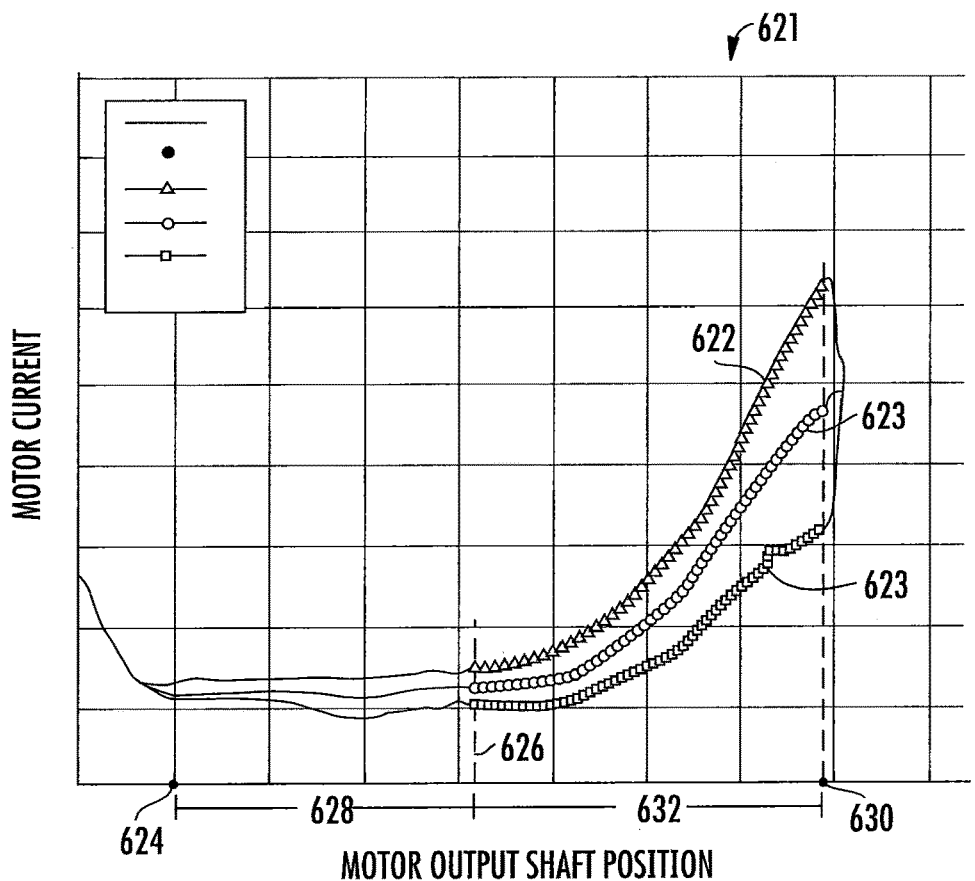
FIG. 7 is a graphical representation of a motor current vs. motor output shaft position plot for the method of detecting a ball loss condition illustrated in FIG. 6 of the disclosure.
Figure 8:
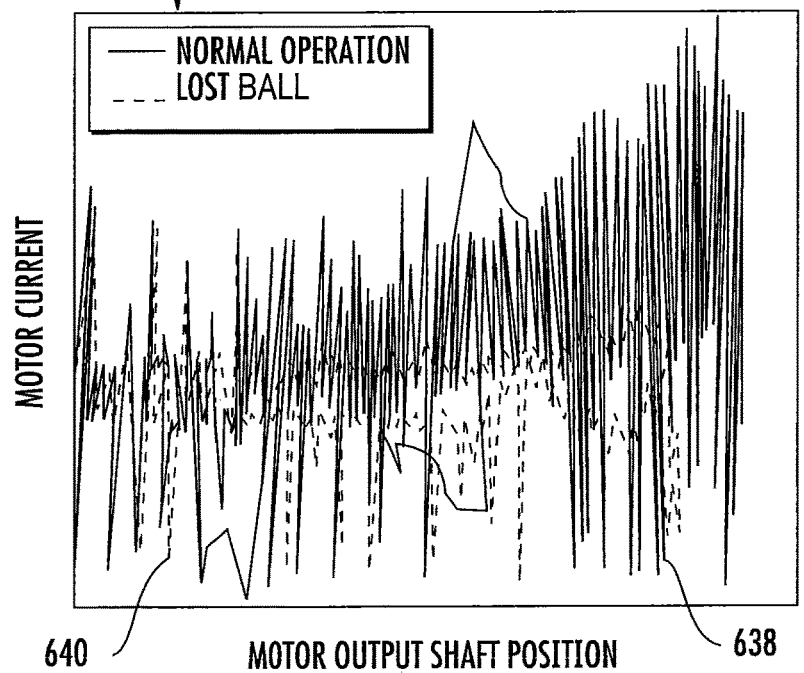
FIG. 8 is a graphical representation of a motor current vs. motor output shaft position plot illustrating the effect of a ball loss condition on the amount of current used by one or more motors of a ball and ramp assembly.

FIGS. 6-8 illustrate a method of determining a ball loss condition within one or more ball and ramp assemblies 403 of the drive unit assembly 400 according to an embodiment of the disclosure. As previously discussed, the one or more ball and ramp assemblies 403 of the one or more clutch pack assemblies 402 are used in order to translate the rotational motion of the one or more motors 506 into an axial motion that will apply a variable amount of force onto the plurality of first and second clutch plates 460 and 462 of the one or more clutch pack assemblies 402. Additionally, as previously discussed, the one or more clutch pack assemblies 402 of the drive unit assembly 400 are used to precisely control the amount of torque that is transmitted from the engine (not shown) to one or more of the wheel assemblies (not shown) of the vehicle (not shown) by applying a variable amount of force onto the first and second plurality of clutch plates 460 and 462 by the one or more ball and ramp assemblies 403.

In order for the one or more ball and ramp assemblies 403 to apply a variable amount of force onto the first and/or second plurality of clutch plates 460 and/or 462, the one or more motors 506 selectively rotate the motor output shaft 510 which drives the one or more gear sets 508 which in turn selectively rotates the first and/or second plates 486 and/or 488 of the one or more ball and ramp assemblies 403. As the first and/or the second plate 486 and/or 488 of the one or more ball and ramp assemblies 403 are rotated, the one or more balls 490 are translated from their home position or pocket (not shown) along the update slope of the one or more first and second plate grooves 501 and 503 in the first and second plates 486 and 488. As the one or more balls 490 travel along the one or more first and second plate grooves 501 and 503 of the first and second plates 486 and 488, the gap between the first plate 486 and the second plate 488 increases as the second plate 488 and the second thrust bearing 504 is translated axially toward the first and second plurality of clutch plates 460 and 460 of the one or more clutch pack assemblies 402. Once the second thrust bearing 504 is in direct contact with at least a portion of the first and/or second plurality of clutch plates 460 and 462 the one or more ball and ramp assemblies 403 and the one or more motors 506 begin to apply a variable amount of force onto the one or more clutch pack assemblies 402 thereby providing the drive unit assembly 400 with the desired amount of clutch torque or torque vectoring capabilities.

As the one or more balls 490 of the one or more ball and ramp assemblies 403 travel along slope of the one or more first and second plate grooves 501 and 503 of the first and second plates 486 and 488, one or more of the one or more balls 490 may lose their desired position and fall back down the slope of the one or more first and second plate grooves 501 and 503 toward their home position (not shown). This loss of position is referred to a ball loss condition thereby reducing and/or completely eliminating the ability of the one or more clutch pack assemblies 402 to provide the desired amount of torque vectoring capabilities to the drive unit assembly 400. It is therefore to be understood that when the one or more ball and ramp assemblies 403 experience a ball loss condition, one or more of the one or more balls 490 have translated down the slope of the one or more first and second plate grooves 501 and 503 of the first and second plates 486 and 488 toward their home position (not shown).

In order to identify or determine the occurrence of a ball loss condition 602 within the one or more ball and ramp assemblies 403 of the drive unit assembly 400, a method of detecting a ball loss condition 600 is run. As illustrated in FIG. 6 of the disclosure and as a non-limiting example, the method of detecting a ball loss condition 600 first includes a data gathering step 604. As part of the data gathering step 604, one or more actuation profiles 606 are run by the one or more motors 506 of the one or more clutch pack assemblies 402 of the drive unit assembly 400. During the running of the one or more actuation profiles 606, one or more cycles are run by the one or more motors 506 to have the one or more ball and ramp assemblies 403 apply a variable amount of force onto the first and/or second plurality of clutch plates 460 and/or 462 of the one or more clutch pack assemblies 402 of the drive unit assembly 400.

While the one or more actuation profiles 606 are ran, the one or more first and second sensors 538 and 544 measure one or more pre-determined parameters or variables 608. As illustrated in FIG. 6 of the disclosure and as a non-limiting example, during the measuring of the one or more pre-determined parameters step 608 of the method of detecting a ball loss condition 600, the one or more second sensors 544 may continuously or at pre-determined intervals measure an amount of current 610 being used by the one or more motors 506 while the one or more actuation profiles 606 are being ran. Additionally, during the measuring of the one or more pre-determined parameters or variables step 608, the one or more first sensors 538 may continuously or at pre-determined intervals measure a position 612 of the motor output shaft 510 while the one or more actuation profiles 606 are being run.

Once the one or more pre-determined parameters or variables 608 are measured by the one or more first and second sensors 538 and 544, the one or more pre-determined parameters or variables 608 are sent 614 to one or more data buffers 616 in the one or more control units 540. The one or more data buffers 616 of the one or more control units 540 is a region of physical memory storage that is used to temporarily store the one or more pre-determined parameters or variables 608 during the data gathering step 604 while it is being transferred from one location to another within the one or more control units 540 and/or the vehicle bus 548 of the vehicle (not shown). It is within the scope of this disclosure and as a non-limiting example that the data gathered during the data gathering step 604 may be received by the one or more data processors 546 and/or 552 of the one or more control units 540 and/or the vehicle bus 548 for analysis according to the method of detecting a ball loss condition 600 described herein.

According to an embodiment of the disclosure and as a non-limiting example, the method of detecting a ball loss condition 600 may further include the step of averaging 618 the one or more pre-determined parameters or variables measured 608 by the one or more first and second sensors 538 and 544. This will provide a mean value for the one or more pre-determined parameters measured 608 during the one or more actuation profiles 606 ran thereby providing an average profile for the one or more clutch pack assemblies 402 of the drive unit 400.

After the data gathering step 604 has been completed, one or more motor current vs. motor output shaft position plots are generated 620 in order to provide a force vs. position behavior for the one or more ball and ramp assemblies 403 using one or more motors 506. It is within the scope of this disclosure and as a non-limiting example, that the data gathered during the data gathering step 604 may be received and analyzed by the one or more data processors 546 and/or 552 of the one or more control units 540 and/or the vehicle bus 548. FIG. 7 of the disclosure provides a graphical representation of an exemplary motor current vs. motor output shaft position plot 621 generated in accordance with the method of detecting a ball loss condition 600 described herein. As illustrated in FIG. 7 of the disclosure and as a non-limiting example, the data gathered during the data gathering step 604 of the method of detecting a ball loss condition 600 generates one or more characteristic curves 622. The one or more characteristic curves 622 of the one or more motor current vs. motor output shaft position plots 621 define an ideal operation condition for the one or more motors 506 and the one or more ball and ramp assemblies 403 of the drive unit 400.

Throughout the operation of the drive unit assembly 400, one or more first sensors 538 measure, either continuously or at pre-determined intervals, the position of the motor output shaft 510 of the one or more motors 506. Additionally, the one or more second sensors 54 of the control unit 540 measure, either continuously or at pre-determined intervals, the amount of current being used by the one or more motors 506 of the one or more ball and ramp assemblies 403. This data gathered is then plotted on the one or more motor current vs. motor output shaft position plots 621 as one or more curves 623 for analysis according to the method of detecting a ball loss condition 600 described herein.

As it can be seen by referencing FIG. 7 of the disclosure and as a non-limiting example, then the one or more ball and ramp assemblies 403 are in their home position 624, the amount of current needed to achieve that position by the motor output shaft 510 of the one or more motors 506 is at its lowest. Once the one or more ball and ramp assemblies 403 reach a kiss point 626 for the one or more clutch assemblies 402, the amount of current needed to achieve each position of the one or more ball and ramp assemblies 403 increases. It is to be understood that the kiss point 626 is the point at which the one or more ball and ramp assemblies 403 and/or the second thrust bearing 504 begin to apply an amount of force onto the first and/or second plurality of clutch plates 460 and/or 462 of the one or more clutch pack assemblies 402 of the drive unit assembly 400.

In the region 628 between home position 624 and the kiss point 626, the one or more balls 490 of the one or more ball and ramp assemblies 403 are being translated up the incline of the one or more first and second plate grooves 501 and 503 thereby translating the second plate 488 axially toward the first and second plurality of clutch plates 460 and 462. Since in this region the one or more ball and ramp assemblies 403 and/or the second thrust bearing 504 are not applying an amount of force onto the first and/or second plurality of clutch plates 460 and/or 462 of the one or more clutch pack assemblies 402, the amount of current needed to achieve these positions are substantially the same.

When the motor output shaft 510 of the one or more motors 506 are at a position 630 illustrated in FIG. 7 of the disclosure and as a non-limiting example, the one or more ball and ramp assemblies 403 and/or the second thrust bearing 504 are applying a pre-determined maximum amount of force onto the first and/or second plurality of clutch plates 460 and/or 462 of the one or more clutch pack assemblies 402. At the position 630 illustrated in FIG. 7 and as a non-limiting example, the amount of current needed to achieve that position of the motor output shaft 510 of the one or more motors 506 is at its maximum.

In the region 632 between the kiss point 626 and the position 630 illustrated in FIG. 7 and as a non-limiting example, the one or more ball and ramp assemblies 403 and/or the second thrust bearing 504 are applying an increasing amount of force onto the first and/or second plurality of clutch plates 460 and/or 462 of the one or more clutch pack assemblies 402. It is therefore to be understood that as the amount of force applied by the one or more ball and ramp assemblies 403 and/or the second thrust bearing 504 increases, the amount of current needed to achieve those positions of the motor output shaft 510 of the one or more motors 506 increases exponentially.

Once the one or more pre-determined parameters have been measured 608 by the one or more first and second sensors 538 and 544, an amount of force is determined 634. The amount of force determined 634 relates to the amount of force applied by the one or more ball and ramp assemblies 403 onto the first and/or second plurality of clutch plates 460 and/or 462 of the one or more clutch pack assemblies 402 during the running of the one or more actuation profiles 606. In accordance with an embodiment of the disclosure and as a non-limiting example, the amount of force 634 applied by the one or more ball and ramp assemblies 403 onto the one or more clutch pack assemblies 402 may be determined by utilizing the motor current 610 and the motor output shaft position 612 data measured during the running of the one or more actuation profiles 606. The amount of torque $T_m$ generated by the one or more motors 506 of the drive unit assembly 400 is proportional to the amount of current $A_m$ used by the one or more motors 506 during the running of the one or more actuation profiles 606. As a result, the amount of torque $T_m$ generates by the one or more motors 506 may be determined by $$T_m = A_m * C_{Tm}$$

where $C_{Tm}$ is a motor torque constant for the one or more motors 506 of the one or more ball and ramp assemblies 403 of the drive unit assembly 400. The amount of force $F_{BR}$ applied by the one or more ball and ramp assemblies 403 may then be determined based on one or more angles θ1 of the first and/or second plates 486 and/or 488 of the one or more ball and ramp assemblies 402, an amount of internal friction within the one or more ball and ramp assemblies 403, a gear ratio X for the one or more gear sets 508 and the amount of torque $T_m$ determined. As a result, the amount of force $F_{BR}$ may be determined 634 by $$F_{BR} = \theta 1 * X * T_m$$

where the one or more angles θ1 relate to the rotational degree to which the one or more motors 506 have rotated the first and/or the second plates 486 and/or 488 away from their home position (not shown). It is within the scope of this disclosure and as a non-limiting example that one or more of the one or more data processors 546 and/or 552 of the one or more control units 540 and/or the vehicle bus 548 may be used in order to determine the amount of force 634 applied by the one or more ball and ramp assemblies 403 onto the one or more clutch pack assemblies 402.

When the one or more ball and ramp assemblies 403 experience a ball loss condition 602, the amount of current needed to achieve a given position decreases. This reduction in the amount of current needed for the one or more motors 506 to achieve a desired position of the motor output shaft 510 can be seen in FIG. 8 of the disclosure. FIG. 8 of the disclosure provides a graphical representation of an exemplary motor current vs. motor output shaft position plot 636 generated in accordance with the method of detecting a ball loss condition 600 described herein. As it can be seen by referencing FIG. 8 of the disclosure and as a non-limiting example, the motor current vs. motor output shaft position plot 636 includes one or more first curves 638 and one or more second curves 640. The one or more first curves 638 of the motor current vs. motor output shaft position plot 636 graphically illustrates the one or more ball and ramp assemblies 403 in normal operation and not experiencing the ball loss condition 602. The one or more second curves 640 of the motor current vs. motor output shaft position plot 636 graphically illustrates the one or more ball and ramp assemblies 403 experiencing one or more of the ball loss conditions 602. As it can be seen by referencing FIG. 8 of the disclosure and as a non-limiting example, there is a reduction in the amount of current needed to achieve a desired position of the motor output shaft 510 during the occurrence of the ball loss condition 602.

While a reduction in current can be an indication of the occurrence of the ball loss condition 602 within the one or more ball and ramp assemblies 403, this alone is not enough to provide a positive determination as to whether or not the ball loss condition 602 has in fact occurred. In fact, additional considerations such as but not limited to, velocity and acceleration effects on the amount of current being used by the one or more motors 506 need to be taken into consideration. Otherwise, a false positive ball loss condition can and will occur. For example, when the one or more motors 506 are accelerating, it could mask the occurrence of or prevent the detection of the ball loss condition 602 within the one or more ball and ramp assemblies 403 of the drive unit assembly 400. As a result, it is to be understood that the amount of current drawn by the one or more motors 506 at a given position of the motor output shaft 510 alone will not provide a positive determination as to whether or not the ball loss condition 602 has in fact occurred.

After the amount of force has been determined 634, the step of checking for a ball loss condition 642 is performed. During the ball loss condition checking step 642, the one or more control units 540 and/or the vehicle bus 548 monitor continuously or at pre-determined intervals the amount of force 634 being applied by the one or more ball and ramp assemblies 403 onto the first and/or second plurality of clutch plates 460 and/or 462. Additionally, during the ball loss condition checking step 642, the one or more control units 540 and/or the vehicle bus 548 monitor continuously or at pre-determined intervals the motor output shaft position requests sent to the one or more motors 506 to have the one or more ball and ramp assemblies 403 apply an amount of force onto the first and/or second plurality of clutch pates 460 and/or 462. If the amount of force/position requests or the amount of torque/position requests exceed a pre-determined threshold, then one or more checks are run 644 in order to prevent the false identification of a ball loss condition within the one or more ball and ramp assembles 403 of the drive unit assembly 400.

Once the one or more motor current vs. motor output shaft position plots 621 have been generated 620, a comparison step 646 is performed. During the comparison step 646, the amount of motor current measured 610 and/or the amount of force determined 632 for the one or more curves 623 of the motor current vs. motor output shaft position plots 621 is compared to the one or more characteristic curves 622 previously generated. If the amount of current measured 610 for the one or more curves 623 is less than the characteristic amount of current determined for that given motor output shaft position within the one or more characteristic curves 622, then a timing error check is performed 648. During the timing error check 648, the amount of motor current measured 610 and/or the amount of force determined 632 is continuously monitored for a pre-determined amount of time t. If the amount of current measured 610 for the one or more curves 623 remains below the characteristic amount of current determined for that given motor output shaft position within the one or more characteristic curves 622 after the time t, then the drop in current is likely due to the occurrence of the ball loss condition 602 and not simply a momentary drop in current due to control actions or measurement noise. This aids in reducing or eliminating false positive ball loss condition identifications which in turn aids in improving the overall life, durability and operational efficiency of the one or more clutch pack assemblies 402 of the drive unit assembly 400.

Once the timing error check 648 has been performed, a flag is sent out 650 within the one or more control units 540 and/or the vehicle bus 548 switching the ball loss indicator from a "0" to a "1". When the ball loss indicator has a "0" value, it indicates that a ball loss condition has not occurred within the one or more ball and ramp assemblies 403 of the drive unit assembly 400. When the ball loss indicator has a "1" value, it is indicating that a potential ball loss has been detected within the one or more ball and ramp assemblies 403 of the drive unit assembly 400. The one or more control units 540 and/or the vehicle bus 548 will then continuously monitor the duration or amount of time the ball loss indicator sends out a "1" value 652. Additionally, the one or more control units 540 and/or the vehicle bus 548 will determine the number of times the ball loss indicator sends out a "1" value within a pre-determined amount of time 652. If the duration of the "1" value or the number of "1" values exceeds a pre-determined amount, then the ball loss condition has been identified or determined 602 and the ball loss indicator will remain at a "1" value until the one or more balls 490 have been successfully recaptured. This final check aids in filtering out potential false positive potential ball loss flags that have been sent 650 that may have occurred due to control actions and measurement noise. This further aids in reducing or eliminating false positive ball loss condition identifications which in turn aids in improving the overall life, durability and operational efficiency of the one or more clutch pack assemblies 402 of the drive unit assembly 400.

After the ball loss condition has been identified 602, one or more ball recapture procedures 654 are run. As a non-limiting example, the one or more ball recapture procedures 654 run includes aligning the home position or pockets of the one or more first and second plate grooves 501 and 503 with each other. Once aligned, the one or more balls 490 will be able to return to their home position allowing for normal operation of the one or more ball and ramp assemblies 403.

Figure 9:
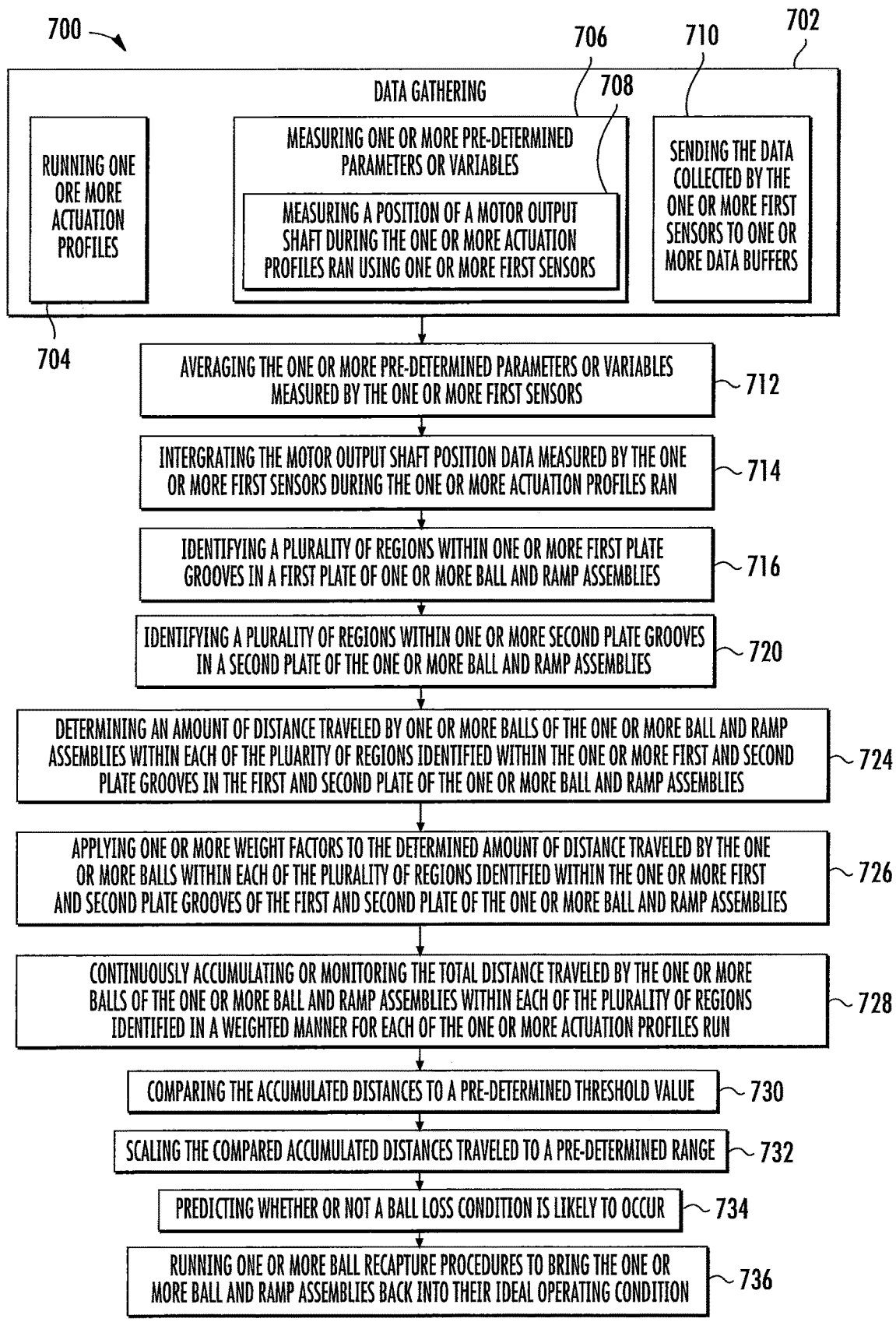
FIG. 9 is a flow-chart illustrating a method of predicting when a ball loss condition will occur according to an embodiment of the disclosure.
Figure 10:
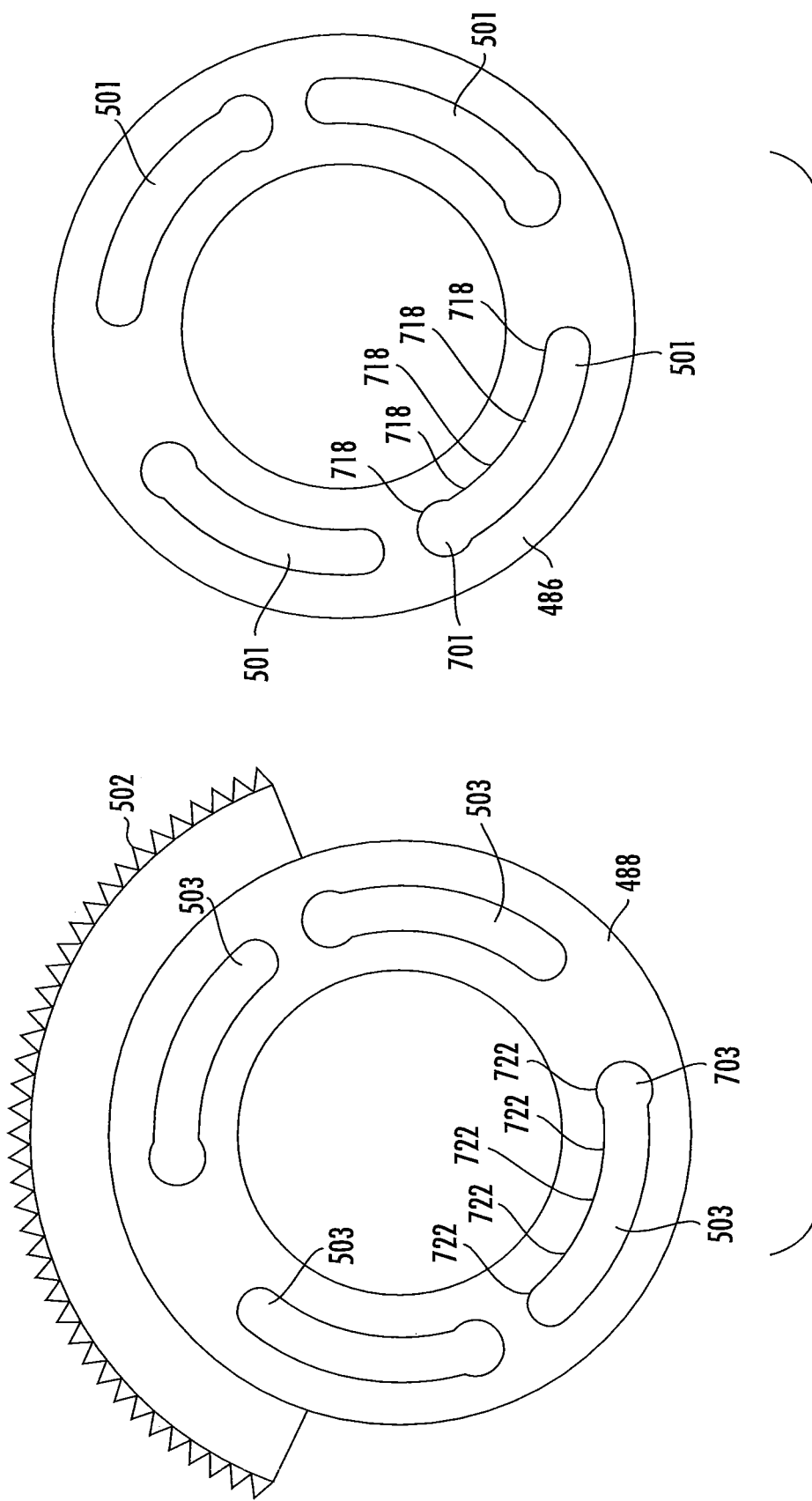
FIG. 10 is a schematic side-view of a first plate and a second plate of one or more ball and ramp assemblies according to an embodiment of the disclosure.

FIGS. 9 and 10 illustrate a method of predicting when a ball loss condition will occur 700 in order to prevent the occurrence of the ball loss condition 602 within the one or more ball and ramp assemblies 403 of the drive unit assembly 400. As illustrated in FIG. 9 of the disclosure and as a non-limiting example, the method of predicting when a ball loss condition will occur 700 first includes a data gathering step 702. As part of the data gathering step 702, one or more actuation profiles 704 are run by the one or more motors 506 of the one or more clutch pack assemblies 402 of the drive unit assembly 400. The one or more actuation profiles 704 of the method of predicting when a ball loss condition will occur 700 are defined as the total movement of the first and/or the second plate 486 and/or 488 of the one or more ball and ramp assemblies 403 from their home position (not shown) until they return back to their home position (not shown). In accordance with an embodiment of the disclosure and as a non-limiting example, the home position (not shown) for the first and second plates 486 and 488 is the position of the first and second plates 486 and 488 where the ball pockets 701 and 703 of the one or more first and second plate grooves 501 and 503 are aligned with one another. It is within the scope of this disclosure and as a non-limiting example that during the running of the one or more actuation profiles 704, one or more cycles may be run by the one or more motors 506 to have the one or more ball and ramp assemblies 403 apply a variable amount of force onto the first and/or second plurality of clutch plates 460 and/or 462.

While the one or more actuation profiles 704 are ran, the one or more first sensors 538 measure one or more pre-determined parameters or variables 706. As illustrated in FIG. 9 of the disclosure and as a non-limiting example, during the measuring of the one or more pre-determined parameters step 706, the one or more first sensors 538 measure a position 708 of the motor output shaft 510 of the one or more motors 506 while the one or more actuation profiles 704 are being run. It is within the scope of this disclosure and as a non-limiting example that the one or more first sensors 538 may continuously or at pre-determined intervals measure the position 708 of the motor output shaft 510 of the one or more motors 506 throughout the one or more actuation profiles 704 ran. By measuring the position 708 of the motor output shaft 510 of the one or more motors 506, the total distance traveled by the first and/or second plate 486 and/or 488 during the running of the one or more actuation profiles 704 can be determined.

Once the one or more pre-determined parameters or variables 706 are measured by the one or more first and second sensors 538 and 544, the one or more pre-determined parameters or variables 608 are sent 614 to one or more data buffers 616 in the one or more control units 540. The one or more data buffers 616 of the one or more control units 540 is a region of physical memory storage that is used to temporarily store the one or more pre-determined parameters or variables 608 during the data gathering step 604 while it is being transferred from one location to another within the one or more control units 540 and/or the vehicle bus 548 of the vehicle (not shown).

Once the one or more pre-determined parameters or variables 706 are measured by the one or more first sensors 538, the one or more pre-determined parameters or variables 706 are sent 710 to the one or more data buffers 616 in the one or more control units 540.

In accordance with the embodiment of the disclosure illustrated in FIG. 9 and as a non-limiting example, the method of predicting when a ball loss condition will occur 700 may further include the step of averaging 712 the one or more pre-determined parameters or variables measured 706 by the one or more first sensors 538. This will provide a mean value for the one or more pre-determined parameters measured 706 during the one or more actuation profiles 704 ran thereby providing an average profile for the one or more clutch pack assemblies 402.

After the one or more pre-determined parameters or variables 706 have been measured, the motor output shaft position data 708 is received and analyzed by the one or more data processors 546 and/or 552 of the one or more control units 540 and/or the vehicle bus 548. Once the motor output shaft position data measured 708 has been received by the one or more data processors 546 and/or 552, the motor output shaft position data measured 708 is integrated for each of the one or more actuation profiles 704 run by the one or more ball and ramp assemblies 403.

The method of predicting when a ball loss condition will occur 700 further includes the step of identifying a plurality of regions 716 within the one or more first plate grooves 501 in the first plate 486 of the one or more ball and ramp assemblies 403. As best seen in FIG. 10 of the disclosure and as a non-limiting example, the plurality of regions 718 within the one or more first plate grooves 501 of the first plate 486 are disposed along the length of the one or more first plate grooves 501. Each of the plurality of regions 718 identified have an upper and a lower bound that define the entrance into one of the plurality of regions 718 and the exit from one of the plurality of regions 718 of the one or more first plate grooves 501.

In accordance with an embodiment of the disclosure and as a non-limiting example, the plurality of regions 718 identified 716 represent different physical and pre-defined segments of the one or more first plate grooves 501 that are fixed based on the position of the motor output shaft 510. According to an alternative embodiment of the disclosure and as a non-limiting example, the plurality of regions 718 identified 716 are not pre-defined segments that are fixed in terms of the position of the motor output shaft 510 needed to put the one or more balls 490 within that particular region of the plurality of regions 718 identified 716. Instead, in accordance with this embodiment of the disclosure, the plurality of regions 718 identified 716 are dependent on the material tolerances, the temperature conditions of the drive unit assembly 400, the amount of wear and tear on the various components within the drive unit assembly 400, the materials of the components of the drive unit assembly 400 and/or the properties of the one or more motors 506. As a result, it is to be understood that the plurality of regions 718 identified 716 may change for the one or more first plate grooves 501 over time or may be different from one drive unit assembly to another.

As illustrated in FIG. 9 of the disclosure and as a non-limiting example, the method of predicting when a ball loss condition will occur 700 further includes the step of identifying a plurality of regions 720 within the one or more second plate grooves 503 in the second plate 488 of the one or more ball and ramp assemblies 403. As best seen in FIG. 10 of the disclosure and as a non-limiting example, the plurality of regions 722 within the one or more second plate grooves 503 of the second plate 488 are disposed along the length of the one or more second plate grooves 503. Each of the plurality of regions 722 identified have an upper and a lower bound that define the entrance into one of the plurality of regions 722 and the exit from one of the plurality of regions 722 of the one or more second plate grooves 503.

In accordance with an embodiment of the disclosure and as a non-limiting example, the plurality of regions 722 identified 720 represent different physical and pre-defined segments of the one or more second plate grooves 503 that are fixed based on the position of the motor output shaft 510. According to an alternative embodiment of the disclosure and as a non-limiting example, the plurality of regions 722 identified 720 are not pre-defined segments that are fixed in terms of the position of the motor output shaft 510 needed to put the one or more balls 490 within that particular region of the plurality of regions 722 identified 720. Instead, in accordance with this embodiment of the disclosure, the plurality of regions 722 identified 720 are dependent on the material tolerances, the temperature conditions of the drive unit assembly 400, the amount of wear and tear on the various components within the drive unit assembly 400, the materials of the components of the drive unit assembly 400 and/or the properties of the one or more motors 506. As a result, it is to be understood that the plurality of regions 722 identified 720 may change for the one or more second plate grooves 503 over time or may be different from one drive unit assembly to another.

Once the plurality of regions 718 and 722 within the first and second plates 486 and 488 have been identified 716 and 720, the amount of distance traveled by the one or more balls 490 within each of the plurality of regions 718 and 722 is determined 724. It is within the scope of this disclosure and as a non-limiting example that the position of and therefore the distance traveled by the one or more balls 490 may be determined based on the position of the motor output shaft 510 measured 708, the amount of force $F_{BR}$ applied by the one or more ball and ramp assemblies 403 and/or the angle θ1 of the first and/or second plate 486 and/or 488. The amount of distance traveled 724 within each of the plurality of regions 718 and 722 identified 716 and 720 is not solely dependent on the entering and exiting of a given region. Each and every change in the direction of the one or more balls 490 within each of the plurality of regions 718 and 722 identified 716 and 720 is counted toward the total distance traveled determined 724 in this step.

After the amount of distance traveled within each of the plurality of regions 718 and 722 has been determined 724, one or more weight factors are then applied 726 to the amount of distance traveled within each of the plurality of regions 718 and 722 identified 716 and 720 in the one or more first and second grooves 501 and 503 of the first and second plates 486 and 488. The weight factor applied to each of the plurality of regions 718 and 722 identified 716 and 720 is dependent on the amount of force $F_{BR}$ that the one or more ball and ramp assemblies 403 will apply onto the first and/or second plurality of clutch plates 460 and/or 462 within that particular region identified 716 and 720. It is to be understood that the higher position of the motor output shaft 510 measured 708, the further the one or more balls 490 are disposed along the length of the incline of the one or more first and second plate grooves 501 and 503 and the greater the amount of force $F_{BR}$ applied by the one or more ball and ramp assemblies 403 onto the first and/or second plurality of clutch plated 460 and/or 462.

In accordance with an embodiment of the disclosure and as a non-limiting example, the regions of the plurality of regions 718 and 722 identified 716 and 720 corresponding to a greater amount of force $F_{BR}$ being exerted onto the first and/or second plurality of clutch plates 460 and/or 462 have a lesser amount of influence one the occurrence of a ball loss condition and are thus weighted less. The regions of the plurality of regions 718 and 722 identified 716 and 720 corresponding to a lower amount of force $F_{BR}$ being exerted onto the first and/or second plurality of clutch plates 460 and/or 462 have a greater amount of influence one the occurrence of a ball loss condition and are thus weighted more. As a result, it is to be understood that the weighted average applied to each region of the plurality of regions 718 and 722 identified 716 and 720 reduces as the one or more balls 490 travel up the incline of the one or more first and second plate grooves 501 and 503 of the first and second plates 586 and 488. In the same way, the weighted average applied to each region of the plurality of regions 718 and 722 identified 716 and 720 increases as the one or more balls 490 travel down the incline of the one or more first and second plate grooves 501 and 503 of the first and second plates 586 and 488. It is therefore to be understood that the greater the amount of distance traveled determined 724, within the low force $F_{BR}$ regions of the one or more first and second grooves 501 and 503, the greater the impact on the method of predicting when a ball loss condition will occur 700.

As illustrated in FIG. 9 of the disclosure and as a non-limiting example, the method of predicting when a ball loss condition will occur 700 further includes the step of continuously accumulating and/or monitoring the total distance traveled by the one or more balls 490 within each region of the plurality of regions 718 and 722 identified 716 and 720 in a weighted manner for each of the one or more actuation profiles run 704. These accumulated amount of weighted distanced traveled determined 728 are then compared to a pre-determined threshold value 730. It is within the scope of this disclosure and as a non-limiting example that the pre-determined threshold value 730 represents a limit for the total amount of travel by the one or more balls 490 of the one or more ball and ramp assemblies 403 within a given actuation profile run 704.

The accumulated amount of weighted distanced traveled determined 728 compared to a pre-determined threshold value 730 is then scaled to a pre-determined range 732. In accordance with an embodiment of the disclosure and as a non-limiting example, the pre-determined range 732 may be from approximately 0 to approximately 100 which can be seen as a percentage of approximately 0% to approximately 100%. The closer the accumulated amount of weighted distanced traveled determined 728 is to the pre-determined threshold value 730, the higher the scaling 732. The further the accumulated amount of weighted distanced traveled determined 728 is from the pre-determined threshold value 730, the lower the scaling 732. In accordance with an embodiment of the disclosure and as a non-limiting example, any accumulated amount of weighted distanced traveled 728 that is determined to be scaled 732 over 100%, will not be accumulated 728, weighted 726 or sent out for analysis by the one or more data processors 546 and/or 552.

Once the accumulated amount of weighted distanced traveled determined 728 has been compared to a pre-determined threshold value 730 and scaled to the pre-determined range 732, the step of predicting whether or not a ball loss condition will occur 734 is performed. If the scaled to a pre-determined range determined 732 is low, for example from approximately 0% to approximately 30%, then the likelihood of the occurrence of a ball loss condition is low and a ball loss condition indicator value "1" is not triggered. If however, the scaled to a pre-determined range determined 732 is high, for example from approximately 80% to approximately 100%, then the likelihood of the occurrence of a ball loss condition is high and a ball loss condition indicator value "1" is triggered.

When the method of predicting when a ball loss condition 700 described herein has predicted 734 that the occurrence of a ball loss condition is high and the ball loss indicator valve "1" has been triggered, one or more ball recapture procedures are run 736. As a non-limiting example, the one or more ball recapture procedures 736 run includes aligning the home position or pockets 701 and 703 of the one or more first and second plate grooves 501 and 503 with each other. Once aligned, the one or more balls 490 will be able to return to their home position allowing for normal operation of the one or more ball and ramp assemblies 403. Upon successful completion of the ball recapture 736, the ball loss indicator value is set back to "0", the accumulated amount of weighted distanced traveled determined 728 are set back to zero and the method of predicting when a ball loss condition 700 is started over again. As a result, the method of predicting when a ball loss condition 700 described herein allows the one or more ball and ramp assemblies 403 to prevent a ball loss condition from occurring. This aids in increasing the overall operational efficiency of the drive unit assembly 400 by reducing or eliminating the number of ball loss conditions that occur within the one or more ball and ramp assemblies 403 when in operation. Additionally, this aids in increasing the overall accuracy and duration of the amount of force that is applied by the one or more ball and ramp assemblies 403 onto the first and/or second plurality of clutch plates 486 and/or 488 by reducing or eliminating the number of ball loss conditions thereby improving the overall operation of the drive unit assembly 400.

It is within the scope of this disclosure that the various embodiments of the disclosure described and illustrated herein may be combined with one another to make a method of determining the occurrence of a ball loss condition and/or a method of predicting when a ball loss condition will occur according to an embodiment of the disclosure. Additionally, it is within the scope of this disclosure that the various embodiments of the drive unit assembly described herein may be combined to provide a drive unit assembly incorporating the use of a ball loss condition and/or a method of predicting when a ball loss condition will occur according to an embodiment of the disclosure.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. A method of detecting a ball loss condition, comprising:
   providing a drive unit assembly, wherein said drive unit assembly comprises one or more clutch pack assemblies, one or more ball and ramp assemblies and one or more motors with a motor output shaft drivingly connected to at least a portion of said one or more ball and ramp assemblies;
   running one or more actuation profiles with said one or more motors;
   measuring an amount of motor current used by said one or more motors during said one or more actuation profiles ran;
   measuring a position of said motor output shaft of said one or more motors during said one or more actuation profiles ran;
   generating one or more motor current versus motor output shaft position plots having one or more characteristic curves based on said amount of motor current measured and said position of said motor output shaft measured during said one or more actuation profiles ran;
   comparing said amount of motor current measured and said motor output shaft position measured for one or more of said one or more actuation profiles ran to said one or more characteristic curves generated; and
   identifying an occurrence of a ball loss condition within said one or more ball and ramp assemblies of said drive unit assembly based on said comparison of said amount of motor current measured and said motor output shaft position measured for one or more of said one or more actuation profiles ran to said one or more characteristic curves generated.

2. The method of detecting a ball loss condition of claim 1, wherein said one or more motors is one or more electric motors, one or more actuators, one or more linear actuators, one or more pneumatic actuators, one or more hydraulic actuators, one or more electro-mechanical actuators and/or one or more electro-magnetic actuators.

3. The method of detecting a ball loss condition of claim 1, further comprising the step of:
   providing one or more first sensors, wherein said one or more first sensors are disposed radially outboard from said motor output shaft and are operably configured to measure said position of said motor output shaft.

4. The method of detecting a ball loss condition of claim 3, wherein said one or more first sensors are one or more Hall Effect sensors, one or more Hall sensors, one or more rotary encoders, one or more proximity sensors and/or one or more capacitive displacement sensors.

5. The method of detecting a ball loss condition of claim 1, further comprising the step of:
   providing one or more second sensors, wherein said one or more second sensors are operably configured to measure said amount of motor current used by said one or more motors.

6. The method of detecting a ball loss condition of claim 5, wherein said one or more second sensors are one or more Hall Effect current sensors, one or more Hall current sensors and/or one or more resistors.

7. The method of detecting a ball loss condition of claim 1, further comprising the step of:
   averaging said amount of motor current measured and said motor output shaft position measured during said one or more actuation profiles ran.

8. The method of detecting a ball loss condition of claim 1, further comprising the step of:
   performing a timing error check, wherein said timing error check is performed if said amount of motor current measured for one or more of said one or more actuation profiles ran is less than said characteristic amount of current determined for that motor output shaft position of said one or more characteristic curves, wherein said timing error check monitors and/or compares said amount of motor current measured for a pre-determined amount of time to eliminate false positive ball loss condition identifications.

9. The method of detecting a ball loss condition of claim 1, further comprising the step of:
   running one or more ball recapture procedures, wherein during said one or more ball recapture procedures ran includes aligning a home position of a first plate of said one or more ball and ramp assemblies with a home position of a second plate of said one or more ball and ramp assemblies.

10. The method of detecting a ball loss condition of claim 1, further comprising the step of:
    determining an amount of force applied by said one or more ball and ramp assemblies onto said one or more clutch pack assemblies of said drive unit assembly during said one or more actuation profiles ran.

11. The method of detecting a ball loss condition of claim 10, further comprising the step of:
    checking for a ball loss condition based on an amount of force and position requests compared to a pre-determined threshold.

12. The method of detecting a ball loss condition of claim 1, further comprising the steps of:

sending out a flag to indicate a potential ball loss condition within said one or more ball and ramp assemblies;

monitoring an amount of time said flag has been sent out to indicate a potential ball loss condition; and monitoring a number of times a potential ball loss condition flag has been sent out within a pre-determined amount of time in order to eliminate false positive ball loss condition identifications.

13. The method of detecting a ball loss condition of claim 1, further comprising the steps of:

providing one or more control units having one or more data processors and one or more second sensors, wherein said one or more second sensors are operably configured to measure said amount of motor current used by said one or more motors during said one or more actuation profiles ran;

providing one or more first sensors, wherein said one or more first sensors are disposed radially outboard from said motor output shaft, and are operably configured to measure said position of said motor output shaft;

sending said an amount of current used by said one or more motors during said one or more actuation profiles ran and measured by said one or more second sensors to said one or more data processors of said one or more control units; and sending said motor output shaft position measured during said one or more motor actuation profiles ran by said one or more first sensors to said one or more data processors of said one or more control units.

14. The method of detecting a ball loss condition of claim 13, wherein said ball loss condition is identified by said one or more data processors of said one or more control units.

15. The method of detecting a ball loss condition of claim 1, further comprising the steps of:

providing one or more control units having one or more second sensors, wherein said one or more second sensors are operably configured to measure said amount of motor current used by said one or more motors;

providing a vehicle bus having one or more data processors;

sending said motor output shaft position measured during said one or more motor actuation profiles ran by said one or more first sensors to said one or more data processors of said vehicle bus; and sending said an amount of current used by said one or more motors during said one or more actuation profiles ran and measured by said one or more second sensors to said one or more data processors of said vehicle bus.

16. The method of detecting a ball loss condition of claim 15, wherein said ball loss condition is identified by said one or more data processors of said vehicle bus.

\* \* \* \* \*